(12) United States Patent
Nahrgang et al.

(10) Patent No.: US 10,965,616 B2
(45) Date of Patent: Mar. 30, 2021

(54) NONSTOP COMPUTING FABRIC ARRANGEMENTS

(71) Applicants: Kyle Nahrgang, Malvern, PA (US); James R. Hunter, Malvern, PA (US); John A Landis, Malvern, PA (US); William L Weber, III, Malvern, PA (US)

(72) Inventors: Kyle Nahrgang, Malvern, PA (US); James R. Hunter, Malvern, PA (US); John A Landis, Malvern, PA (US); William L Weber, III, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 137 days.

(21) Appl. No.: 14/519,532

(22) Filed: Oct. 21, 2014

(65) Prior Publication Data

US 2016/0112346 A1    Apr. 21, 2016

(51) Int. Cl.
*H04L 12/933* (2013.01)
*H04L 29/08* (2006.01)
*H04L 29/12* (2006.01)
*G06F 9/50* (2006.01)

(52) U.S. Cl.
CPC ............ *H04L 49/15* (2013.01); *G06F 9/5077* (2013.01); *H04L 61/1511* (2013.01); *H04L 67/16* (2013.01)

(58) Field of Classification Search
CPC ............ H04L 41/5003; H04L 61/1511; H04L 29/12066; G06F 9/5077; G06F 9/45558; G06F 11/1484; G06F 2009/4557; G06F 13/4004; G06F 12/109; G06F 9/45533; G06F 21/6218
USPC ................ 709/201, 220, 218, 226, 245, 224
See application file for complete search history.

(56) References Cited

U.S. PATENT DOCUMENTS

| | | | | |
|---|---|---|---|---|
| 2001/0052016 | A1* | 12/2001 | Skene | G06F 9/505 709/226 |
| 2002/0099823 | A1* | 7/2002 | Jemes | H04L 29/06 709/225 |
| 2006/0242330 | A1* | 10/2006 | Torudbakken | G06F 13/4004 710/5 |
| 2007/0028244 | A1* | 2/2007 | Landis | G06F 9/5016 718/108 |
| 2007/0067366 | A1* | 3/2007 | Landis | G06F 12/1009 |
| 2009/0006710 | A1* | 1/2009 | Daniel | G06F 9/45558 710/315 |

(Continued)

*Primary Examiner* — Tonia L Dollinger
*Assistant Examiner* — Ishrat Rashid

(57) ABSTRACT

Systems and methods for non-stop computing in a virtualization fabric are disclosed. One system includes a computing fabric comprising a plurality of host platforms, the plurality of host platforms including at least a first host platform and a second host platform communicatively connected to the first host platform. The system also includes an interconnect service partitions residing on the first host platform. The system includes a plurality of guest partitions distributed across the plurality of host platforms. The system further includes a DNS server instance managed by at least one of the plurality of interconnect service partitions and defining at least one zone, the at least one zone including one or more partitions from among the plurality of guest partitions distributed across the plurality of host platforms.

20 Claims, 17 Drawing Sheets

(56) References Cited

U.S. PATENT DOCUMENTS

| | | | |
|---|---|---|---|
| 2009/0113075 A1* | 4/2009 | Migault | H04L 61/1511 |
| | | | 709/245 |
| 2010/0017873 A1* | 1/2010 | Sievert | G06F 9/5077 |
| | | | 726/17 |
| 2012/0215881 A1* | 8/2012 | Beckwith | H04L 41/0803 |
| | | | 709/217 |
| 2015/0067297 A1* | 3/2015 | Arroyo | G06F 12/10 |
| | | | 711/206 |
| 2015/0207758 A1* | 7/2015 | Mordani | H04L 47/78 |
| | | | 709/226 |
| 2016/0070597 A1* | 3/2016 | Riggin | G06F 9/50 |
| | | | 718/1 |

* cited by examiner

NONSTOP COMPUTING FABRIC ARRANGEMENTS

TECHNICAL FIELD

The present disclosure relates generally to distributed computing. In particular, the present disclosure relates nonstop computing fabric arrangements, and features thereof.

BACKGROUND

Computer system virtualization allows multiple operating systems and processes to share the hardware resources of a host computer. Ideally, the system virtualization provides resource isolation so that each operating system does not realize that it is sharing resources with another operating system and does not adversely affect the execution of the other operating system. Such system virtualization enables applications including server consolidation, co-located hosting facilities, distributed web services, applications mobility, secure computing platforms, and other applications that provide for efficient use of underlying hardware resources.

Existing virtualization systems, such as those provided by VMWare and Microsoft, have developed relatively sophisticated virtualization systems that are architected as a monolithic virtualization software system that hosts each virtualized system. In other words, these virtualization systems are constructed to host each of the virtualized systems on a particular computing platform. As such, the virtualization systems or virtual machine monitors (VMMs) associate hardware resources of a particular platform with each partition. Typically, this involves sharing of resources across multiple partitions. For example, two partitions may share a same processor and memory resource (although may be separated by address ranges or otherwise maintained to ensure isolated memory management). Furthermore, two such partitions may also share input/output devices, such as keyboards, mice, printing ports, Ethernet ports, or other communications interfaces.

Although such arrangements are possible, they are suboptimal in a number of respects. For example, because each virtual machine lacks knowledge of other virtual machines, it is possible, if not likely, that each virtual machine may utilize the underlying resources of the host system in a way that negatively affects other partitions on the same host system. For example, a particularly bandwidth-intensive application in one partition may cause that partition to utilize the majority of bandwidth available to the host computing system on which the partitition hosting the application resides. In such situations, other partitions on the host computing system may have only limited bandwidth available to them, when they would otherwise expect to have substantially greater available bandwidth. In still other arrangements, partitions may be designated as backups for one another on different host systems, for example for purposes of data reliability and uptime. However, even in these scenarios, the different partitions that may be backups of one another must be managed, such that in the event of a failure of a primary partition, the secondary partition can resume operation. Furthermore, although this may be the case for guest partition redundancy, redundancy of system operational partitions, in particular across host systems, is limited in current systems. Additionally, in cases where partitions are able to intercommunicate, such partitions may not have adequate security with respect to other partitions or systems that are within the same fabric, but which should not necessarily be authorized to intercommunicate.

SUMMARY

In summary, the present disclosure relates to security arrangements for cloud computing. In particular, the present disclosure relates to secure integration of hybrid clouds with enterprise networks, as well as remote credential management in such environments.

In a first aspect, a system includes a computing fabric comprising a plurality of host platforms, the plurality of host platforms including at least a first host platform and a second host platform communicatively connected to the first host platform. The system also includes an interconnect service partitions residing on the first host platform. The system includes a plurality of guest partitions distributed across the plurality of host platforms. The system further includes a DNS server instance managed by at least one of the plurality of interconnect service partitions and defining at least one zone, the at least one zone including one or more partitions from among the plurality of guest partitions distributed across the plurality of host platforms.

In a second aspect, a method of managing partitions in a computing fabric includes receiving a definition of a zone within the computing fabric, the computing fabric including a first host computing system and a second computing system. The method also includes establishing the zone within the computing fabric via a zone file managed by a DNS service of an interconnect service partition of the first host computing system, the zone including a plurality of guest partitions across the first host computing system and the second host computing system.

In a third aspect, a method of managing partitions in a computing fabric is disclosed. The method includes receiving a definition of a zone within the computing fabric, the computing fabric including a first host computing system and a second computing system. The method also includes establishing the zone within the computing fabric via a zone file managed by a DNS service of an interconnect service partition of the first host computing system, the zone including a plurality of guest partitions across the first host computing system and the second host computing system. The method also includes limiting connection to the first host computing system to host computing systems including partitions included in any zone also including a partition hosted by the first host computing system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
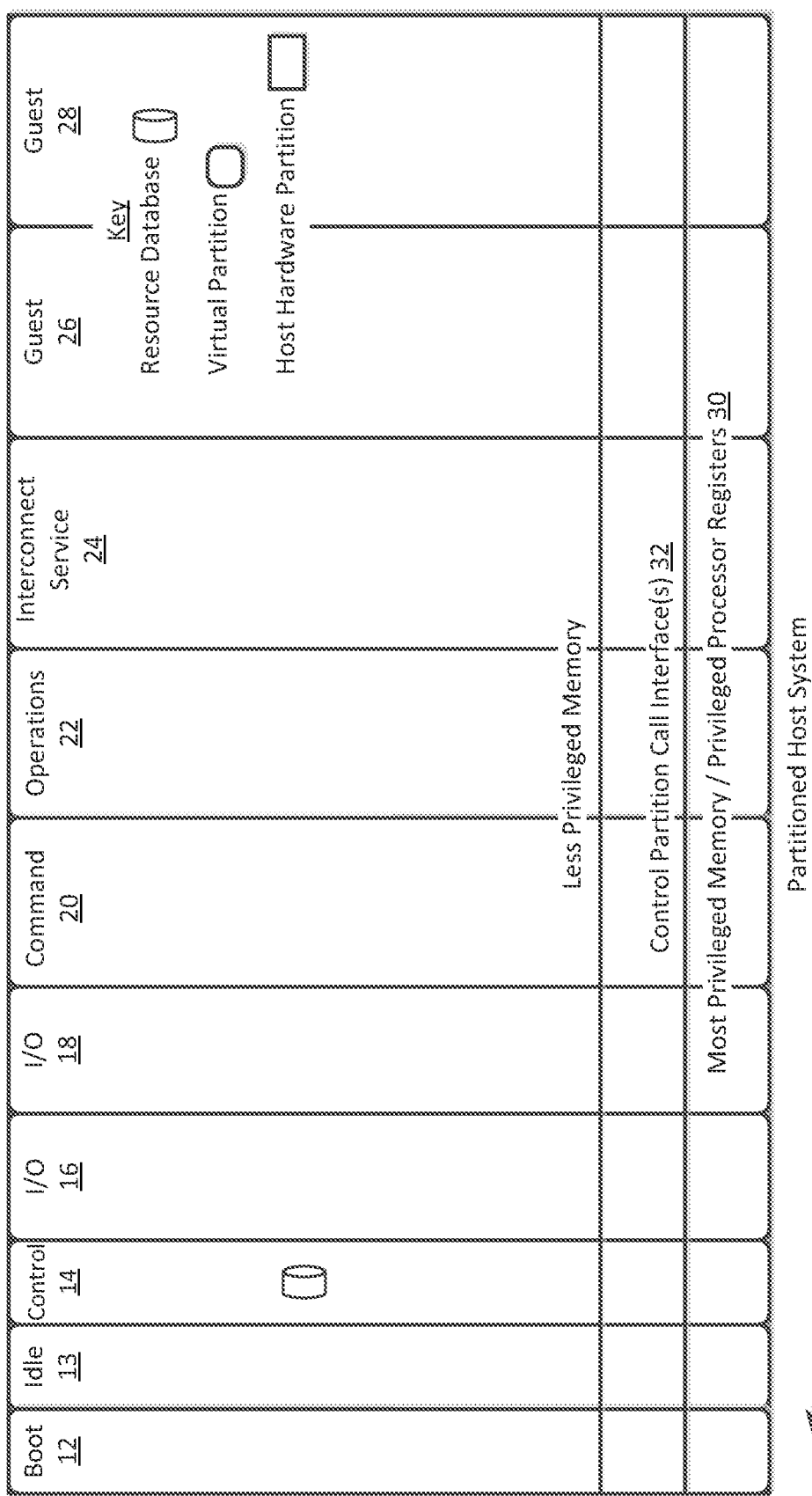
FIG. 1 illustrates system infrastructure partitions in an exemplary embodiment of a host system partitioned using the para-virtualization system of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

As briefly described above, embodiments of the present disclosure are directed to implementations utilizing virtualization software, and in particular a secure partitioning virtualization software for establishing a non-stop fabric. The non-stop fabric disclosed herein allows for continuous operation of partitions through redundancy across host computing systems, as well as ensured quality of service accomplished through redundancy, access controls, and assignment of dedicated computing resources to allow for particular types of resources to be preserved for use in connection with a particular system partition.

In the context of the present disclosure, virtualization software generally corresponds to software that executes natively on a computing system, through which non-native software can be executed by hosting that software. In such cases, the virtualization software exposes those native resources in a way that is recognizable to the non-native software. By way of reference, non-native software, otherwise referred to herein as "virtualized software" or a "virtualized system", refers to software not natively executed on a particular hardware system, for example due to it being written for execution by a different type of microprocessor configured to execute a different native instruction set. In some of the examples discussed herein, the native software set can be the x86-32, x86-64, or IA64 instruction set from Intel Corporation of Sunnyvale, Calif., while the non-native or virtualized system might be compiled for execution on an OS2200 system from Unisys Corporation of Blue Bell, Pa. However, it is understood that the principles of the present disclosure are not thereby limited; rather, non-native software simply can correspond to software not hosted or executed directly on hardware resources in the absence of a monitor system used to manage such execution, and to provide an abstraction layer between the application or workload to be executed and the underlying hardware resources.

In addition, in connection with the present disclosure, one or more zones can be used to define connectivity among partitions in a distributed, virtualized computing arrangement, such as a para-virtualization system as discussed herein. Zones, as that term is used herein, represent definable groupings of partitions and/or computing systems that may be included within a common virtual network, and which may have particular common configurations or which are monitored by a common server service. In example embodiments discussed herein, a particular, special-purpose partition (e.g., an interconnect service partition) can host such a service, e.g., a DNS service, to manage zones and interconnectivity among partitions and systems.

1. Para-Virtualization System Architecture

Referring to FIG. 1, an example arrangement of a para-virtualization system is shown that can be used in implementing the SR-IOV-based the features mentioned above. In some embodiments, the architecture discussed herein uses the principle of least privilege to run code at the lowest practical privilege. To do this, special infrastructure partitions run resource management and physical I/O device drivers. FIG. 1 illustrates system infrastructure partitions on the left and user guest partitions on the right. Host hardware resource management runs as a control application in a special control partition. This control application implements a server for a command channel to accept transactional requests for assignment of resources to partitions. The control application maintains the master in-memory database of the hardware resource allocations. The control application also provides a read only view of individual partitions to the associated partition monitors.

In FIG. 1, partitioned host (hardware) system (or node), shown as host computing system 10, has lesser privileged memory that is divided into distinct partitions including special infrastructure partitions such as boot partition 12, idle partition 13, control partition 14, first and second I/O partitions 16 and 18, command partition 20, operations partition 22, and interconnect service partition 24, as well as virtual guest partitions 26 and 28. As illustrated, the partitions 12-28 do not directly access the underlying privileged memory and processor registers 30 but instead access the privileged memory and processor registers 30 via a hypervisor system call interface 32 that provides context switches amongst the partitions 12-28 in a conventional fashion. Unlike conventional VMMs and hypervisors, however, the resource management functions of the partitioned host computing system 10 of FIG. 1 are implemented in the special infrastructure partitions 12-22. Furthermore, rather than requiring re-write of portions of the guest operating system, drivers can be provided in the guest operating system environments that can execute system calls. As explained in further detail in U.S. Pat. No. 7,984,104, assigned to Unisys Corporation of Blue Bell, Pa., these special infrastructure partitions 12-24 control resource management and physical I/O device drivers that are, in turn, used by operating systems operating as guests in the guest partitions 26-28. Of course, many other guest partitions may be implemented in a particular host computing system 10 partitioned in accordance with the techniques of the present disclosure.

A boot partition 12 contains the host boot firmware and functions to initially load the control, I/O and command partitions (elements 14-20). Once launched, the resource management "control" partition 14 includes minimal firmware that tracks resource usage using a tracking application referred to herein as a control or resource management application. I-lost resource management decisions are performed in command partition 20 and distributed decisions amongst partitions in one or more host computing systems 10 are managed by operations partition 22. I/O to disk drives and the like is controlled by one or both of I/O partitions 16 and 18 so as to provide both failover and load balancing capabilities. Operating systems in the guest partitions 24, 26, and 28 communicate with the I/O partitions 16 and 18 via memory channels (FIG. 3) established by the control partition 14. The partitions communicate only via the memory channels. Hardware I/O resources are allocated only to the I/O partitions 16, 18. In the configuration of FIG. 1, the hypervisor system call interface 32 is essentially reduced to context switching and containment elements (monitors) for the respective partitions.

Figure 2:
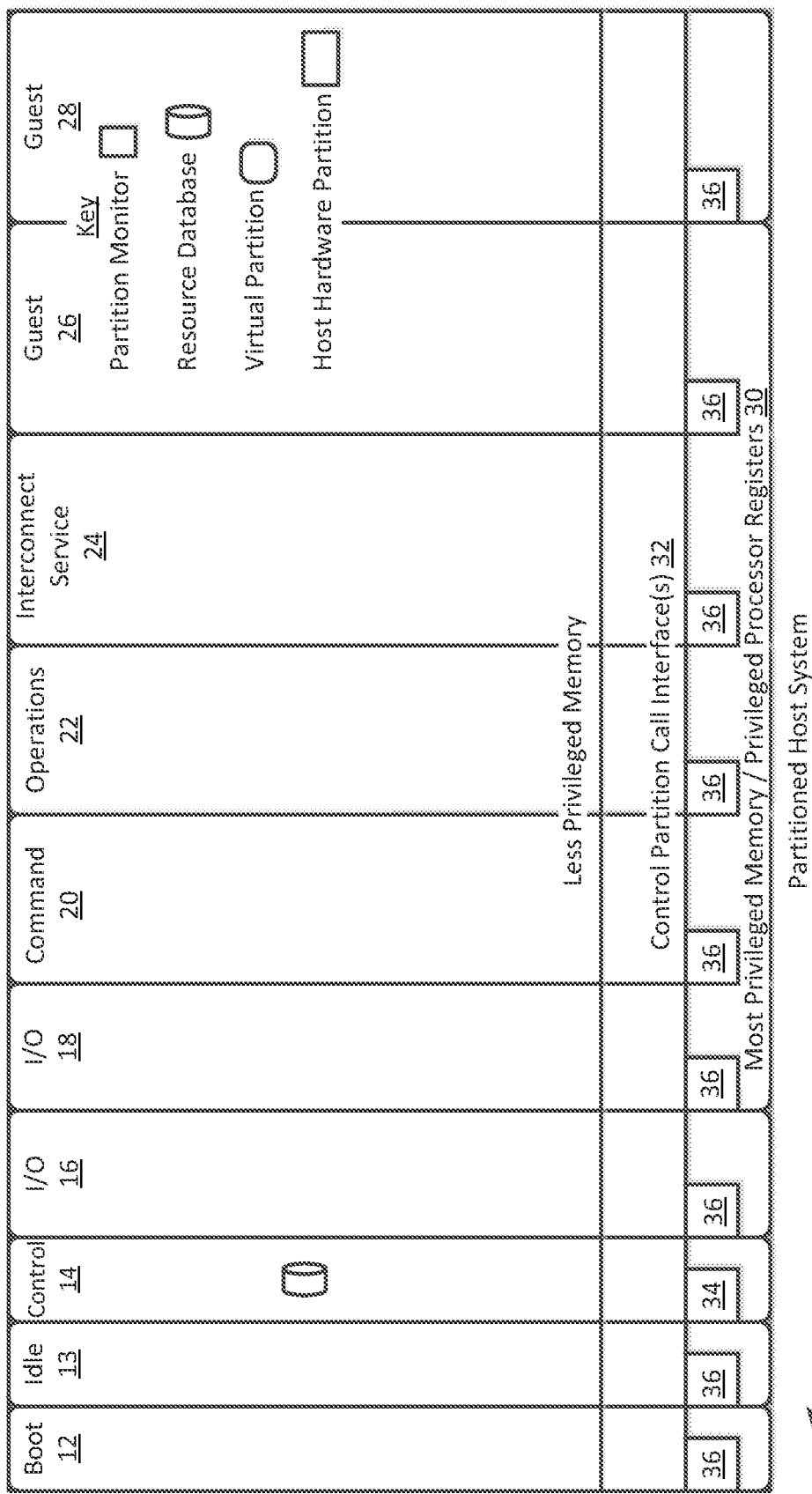
FIG. 2 illustrates the partitioned host of FIG. 1 and the associated partition monitors of each partition.
Figure 3:
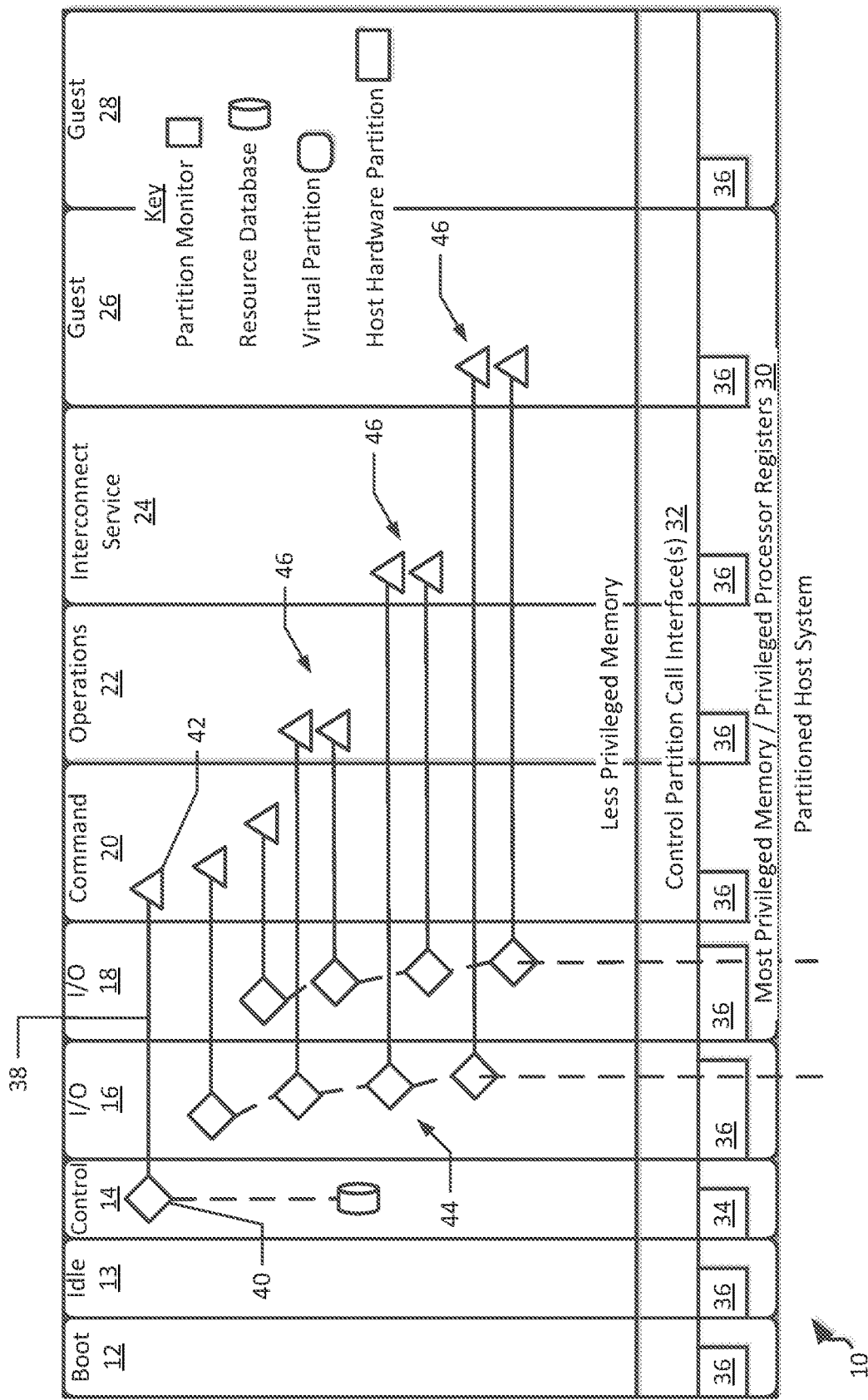
FIG. 3 illustrates memory mapped communication channels amongst various partitions of the para-virtualization system of FIG. 1.

The resource manager application of the control partition 14, shown as application 40 in FIG. 3, manages a resource database 33 that keeps track of assignment of resources to partitions and further serves a command channel 38 to accept transactional requests for assignment of the resources to respective partitions. As illustrated in FIG. 2, control partition 14 also includes a partition (lead) monitor 34 that is similar to a virtual machine monitor (VMM) except that it provides individual read-only views of the resource database in the control partition 14 to associated partition monitors 36 of each partition. Thus, unlike conventional VMMs, each partition has its own monitor 36 per vCPU of the partition such that failure of the monitor 36 does not bring down the entire host computing system 10. As will be explained below, the guest operating systems in the respective partitions 26, 28 (referred to herein as "guest partitions") are modified to access the associated partition monitors 36 that implement together with hypervisor system call interface 32 a communications mechanism through which the control, I/O, and any other special infrastructure partitions 14-24 may initiate communications with each other and with the respective guest partitions.

The partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36. This allows support of multiple system call interfaces 32 and for these standards to evolve over time. It also allows independent upgrade of monitor components in different partitions.

The monitor 36 is preferably aware of processor capabilities so that it may be optimized to utilize any available processor virtualization support. With appropriate monitor 36 and processor support, a guest OS in a guest partition (e.g., 26, 28) need not be aware of the control system of the invention and need not make any explicit 'system' calls to the monitor 36. In this case, processor virtualization interrupts provide the necessary and sufficient system call interface 32. However, to optimize performance, explicit calls from a guest OS to a monitor system call interface 32 are still desirable.

The monitor 36 also maintains a map of resources allocated to the partition it monitors and ensures that the guest OS (and applications) in its partition use only the allocated hardware resources. The monitor 36 can do this since it is the first code running in the partition at the processor's most privileged level. The monitor 36 boots the partition firmware at a decreased privilege. The firmware subsequently boots the OS and applications. Normal processor protection mechanisms prevent the firmware, OS, and applications from ever obtaining the processor's most privileged protection level.

Unlike a conventional VMM, a monitor 36 has no I/O interfaces. All I/O is performed by I/O hardware mapped to T/O partitions 16, 18 that use memory channels to communicate with their client partitions. A responsibility of a monitor 36 is instead to protect processor provided resources (e.g., processor privileged functions and memory management units). The monitor 36 also protects access to I/O hardware primarily through protection of memory mapped I/O. The monitor 36 further provides channel endpoint capabilities which are the basis for I/O capabilities between guest partitions.

The monitor 34 for the control partition 14 is a "lead" monitor with two special roles. It creates and destroys monitors 36, and also provides services to the created monitors 36 to aid processor context switches. During a processor context switch, monitors 34, 36 save the guest partition state in the virtual processor structure, save the privileged state in virtual processor structure and then invoke the control monitor switch service. This service loads the privileged state of the target partition monitor and switches to the target partition monitor which then restores the remainder of the guest partition state.

The most privileged processor level (e.g., x86 ring 0) is retained by having the monitors 34, 36 running below the system call interface 32. This is most effective if the processor implements at least three distinct protection levels: e.g., x86 ring 1, 2, and 3 available to the guest OS and applications. The control partition 14 connects to the monitors 34, 36 at the base (most privileged level) of each partition. The monitor 34 grants itself read only access to the partition descriptor in the control partition 14, and the control partitition 14 has read only access to one page of monitor state stored in the resource database 33.

Those skilled in the art will appreciate that the monitors 34, 36 of the invention are similar to a classic VMM in that they constrain the partition to its assigned resources, interrupt handlers provide protection exceptions that emulate privileged behaviors as necessary, and system call interfaces are implemented for "aware" contained system code. However, as explained in further detail below, the monitors 34, 36 of the invention are unlike a classic VMM in that the master resource database 33 is contained in a virtual (control) partition for recoverability, the resource database 33 implements a simple transaction mechanism, and the virtualized system is constructed from a collection of cooperating monitors 34, 36 whereby a failure in one monitor 34, 36 need not result in failure of all partitions and need not result in the failure of a multiprocessor/multi-core partition; in particular, any symmetric multiprocessing system can, due to use of a monitor per execution core, preserve operation of the partition using remaining execution cores. Furthermore, failure of a single physical processing unit need not result in failure of all partitions of a system, since partitions are affiliated with different processing units.

The monitors 34, 36 of the invention are also different from classic VMMs in that each partition is contained by its assigned monitor(s), partitions with simpler containment requirements can use simpler and thus more reliable (and higher security) monitor implementations, and the monitor implementations for different partitions may, but need not be, shared. Also, unlike conventional VMMs, a lead monitor 34 provides access by other monitors 36 to the control partition resource database 33.

Partitions in the control environment include the available resources organized by host computing system 10. Available computing resources in a host node, also referred to herein as a host computing system are described by way of example in FIGS. 4-5. Generally, a partition is a software construct (that may be partially hardware assisted) that allows a hardware system platform (or hardware partition) to be "partitioned," or separated, into independent operating environments. The degree of hardware assist (e.g., physical hardware separation) is platform dependent but by definition is less than 100% (since by definition a 100% hardware assist provides hardware partitions). The hardware assist may be provided by the processor or other platform hardware features. For example, each partition may be associated with a separate processing core or cores, but may each be associated with a separate portion of the same system memory, networking resources, or other features. Or, partitions may time-share processing resources, but be associated with separate memory, networking, and/or peripheral devices. In general from the perspective of the control partition 14, a hardware partition is generally indistinguishable from a commodity hardware platform without partitioning hardware.

Unused physical processors are assigned to an 'Idle' partition 13. The idle partition 13 is the simplest partition that is assigned processor resources. It contains a virtual processor for each available physical processor, and each virtual processor executes an idle loop that contains appropriate processor instructions to minimize processor power usage. The idle virtual processors may cede time at the next control time quantum interrupt, and the monitor 36 of the idle partition 13 may switch processor context to a virtual processor in a different partition. During host bootstrap, the boot processor of the boot partition 12 boots all of the other processors into the idle partition 13.

In some embodiments, multiple control partitions 14 are also possible for large host partitions to avoid a single point of failure. Each would be responsible for resources of the appropriate portion of the host computing system 10. Resource service allocations would be partitioned in each portion of the host system 10. This allows clusters to run within a host computing system 10 (one cluster node in each zone) and still survive failure of a control partition 14.

As illustrated in FIGS. 1-3, each page of memory in a control partition-enabled host computing system 10 is owned by one of its partitions. Additionally, each hardware I/O device is mapped to one of the designated I/O partitions 16, 18. These I/O partitions 16, 18 (typically two for redundancy) run special software that allows the I/O partitions 16, 18 to run the I/O channel server applications for sharing the I/O hardware. Alternatively, for I/O partitions executing using a processor implementing Intel's VT-d technology, devices can be assigned directly to non-I/O partitions. Irrespective of the manner of association, such channel server applications include Virtual Ethernet switch (provides channel server endpoints for network channels) and virtual storage switch (provides channel server endpoints for storage channels). Unused memory and I/O resources are owned by a special 'Available' pseudo partition (not shown in figures). One such "Available" pseudo partition per node of host computing system 10 owns all resources available for allocation, and as such is tracked by resource database 33.

In the embodiments discussed herein, control partition 14 concentrates on server input/output requirements. Plug and Play operating systems function with appropriate virtual port/miniport drivers installed as boot time drivers. The hypervisor system call interface 32 may, in some embodiments, include an Extensible Firmware Interface (EFI) to provide a modern maintainable firmware environment that is used as the basis for the virtual firmware. The firmware provides standard mechanisms to access virtual Advanced Configuration and Power Interface (ACPI) tables. These tables allow operating systems to use standard mechanisms to discover and interact with the virtual hardware.

The boot partition 12 may provide certain Basic Input/Output System (BIOS) compatibility drivers if and when necessary to enable boot of operating systems that lack EFI loaders. The boot partition 12 also may provide limited support for these operating systems.

Different partitions may use different firmware implementations or different firmware versions. The firmware identified by partition policy is loaded when the partition is activated. During an upgrade of the monitor associated with the control partition, running partitions continue to use the loaded firmware, and may switch to a new version as determined by the effective partition policy the next time the partition is reactivated.

As noted above, monitors 36 provide enforcement of isolation from other partitions. The monitors 36 run at the most privileged processor level, and each partition has one or more monitors mapped into privileged address space. Each monitor 36 uses protection exceptions as necessary to monitor software within the virtual partition and to thwart any (inadvertent) attempt to reference resources not assigned to the associated virtual partition. Each monitor 36 constrains the guest OS and applications in the guest partitions 26, 28, and the lead monitor 34 constrains the resource management application in the control partition 14 and uses its access and special hypervisor system call interface 32 with the resource management application to communicate individual partition resource lists with the associated partition monitors 36.

According to some embodiments, there are two main categories of partitions in the virtualization system of the present disclosure. The 'user' partitions run guest operating systems for customer applications, and the system infrastructure partitions provide various platform infrastructure services. For reliability, the virtualization system architecture minimizes any implementation that is not contained within a partition, since a failure in one partition can be contained and need not impact other partitions.

As will be explained in more detail below, system partition, or service partition, types can include:
Boot 12
Idle 13
Control 14
Command 20
Operations 22
I/O 16, 18
Interconnect 24
Each of these types is briefly discussed below.
Boot Partition 12

The boot partition 12 has assigned thereto one virtual CPU (corresponding to a physical processing core or a fractional/timeshared part thereof), and contains the hardware partition boot firmware. It is used during recovery operations when necessary to boot and reboot the command partition 20 and the I/O partitions 16, 18. During bootstrap, the boot partition 12 reserves available memory and constructs the control partition 14 and the initial resource map in resource database 33 with all memory assigned either to the boot partition 12, the control partition 14, or the 'available' partition. The boot partition 12 initiates transactions to the resource manager application until it has also booted the command partition 20. At this point the control partition 14 is attached to the command partition 20 and accepts only its command transactions. The boot partition boot processor also initializes all additional processors to run the idle partition 13.

Idle Partition 13

In example embodiments, the idle partition 13 has one virtual CPU for each physical CPU. These virtual CPUs are used as place holders in the system's CPU schedule. If the control partition 14 or partition monitor 34 error recovery must remove a CPU/partition from the schedule, it is replaced with a reference to one of these virtual CPUs. Idle processors 'run' in the idle partition 13, rather than the control partition 14, to reduce the scope of error recovery should a hardware error occur while a hardware processor is idle. In actuality, the idle partition suspends a processor (to reduce power and cooling load) until the next virtual quantum interrupt. In typical scenarios, processors can be idle a significant fraction of time. The idle time is the current shared processor headroom in the hardware partition.

Control Partition 14

The control partition 14 owns the memory that contains the resource database 33 that stores the resource allocation maps. This includes the 'fractal' map for memory, the processor schedule, and mapped I/O hardware devices. For Peripheral Component Interconnect (PCI) I/O hardware, this map would allocate individual PCI devices, rather than require I/O partitions 16, 18 to enumerate a PCI bus. Different devices on the same PCI bus can be assigned to different I/O partitions 16, 18. A resource allocation application in the control partition 14 tracks the resources, applies transactions to the resource database 33, and is also the server for the command and control channels. The resource allocation application runs in the control partition 14 with a minimal operating environment. All state changes for the resource manager application are performed as transactions. If a processor error occurs when one of its virtual CPUs is active, any partial transactions can be rolled back. The hypervisor system call interface 32, which is responsible for virtual processor context switches and delivery of physical and virtual interrupts, does not write to the master resource maps managed by the application. It constrains itself to memory writes of memory associated with individual partitions and read only of the master resource maps in the resource database 33.

It is noted that, when multiple control partitions 14 are used, an associated command partition 20 can be provided for each. This allows the resource database 33 of a large host to be (literally) partitioned and limits the size of the largest virtual partition in the host while reducing the impact of failure of a control partition 14. Multiple control partitions 14 are recommended for (very) large host partitions, or anytime a partitioned virtualized system can contain the largest virtual partition.

Command Partition 20

In example embodiments, the command partition 20 owns the resource allocation policy for each hardware partition 10. The operating environment is, for example, XP embedded which provides a .NET Framework execution environment. Another possibility is, for example, Windows CE and the .NET Compact Framework.

The command partition 20 maintains a synchronized snapshot of the resource allocation map managed by the resource management application, and all changes to the map are transactions coordinated through the command channel 38 (FIG. 3) with the control partition 14. The resource management application implements the command channel 38 to accept transactions only from the command partition 20.

It is noted that in a multiple host hardware partition environment, a stub command partition 20 in each host 10 could simply run in the EFI environment and use an EFI application to pipe a command channel 38 from the control partition 14, through a network, to a shared remote command partition 20. However, this would have an impact on both reliability and recovery times, while providing only a modest cost advantage. Multiple command partitions 20 configured for failover are also possible, especially when multiple control partitions 14 are present. Restart of a command partition 20 occurs while other partitions remain operating with current resource assignments.

In accordance with the present disclosure, only a resource service in the command partition 20 makes requests of the resource manager application in the control partition 14. This allows actual allocations to be controlled by policy. Agents representing the partitions (and domains, as described below) participate to make the actual policy decisions. The policy service provides a mechanism for autonomous management of the virtual partitions. Standard and custom agents negotiate and cooperate on the use of physical computing resources, such as processor scheduling and memory assignments, in one or more physical host partitions. There are two cooperating services. The partition resource service is an application in the command partition 20 that is tightly coupled with the control resource manager application and provides services to a higher level policy service that runs in the operations partition 22 (described below) and is tightly coupled with (i.e. implements) a persistent partition configuration database, and is a client of the resource service. The resource service also provides monitoring services for the presentation tier. The partition resource objects are tightly controlled (e.g. administrators can not install resource agents) since the system responsiveness and reliability partially depends on them. A catastrophic failure in one of these objects impacts responsiveness while the server is restarted. Recurring catastrophic failures can prevent changes to the resource allocation.

Operations Partition 22

In some embodiments, the operations partition 22 owns the configuration policy for the domains in one or more host computing systems 10. The operations partition 22 is also where a data center operations (policy) service runs. As will be explained below, at least one host computing system 10 in a given virtual data center will have an operations partition 22. Not all host computing systems 10 run an operations partition 22. An operations partition 22 may be provided by multiple hosts in a virtual data center for load balancing and failover. The operations partition 22 does not need to run within a given hardware partition, and need not run as a virtual partition. The operating environment within the operations partition 22 can be, for example, MICROSOFT WINDOWS XP Professional or Windows Server, or analogous operating environments. This partition (cluster) can be shared across multiple hardware partitions. The configuration policy objects and ASP.NET user interface components run in the operations partition 22. These components can share a virtual partition with the command partition 20 to reduce cost for single host deployments.

For availability reasons, customization of partition resource agents is discouraged in favor of customization of policy agents. This is because a failure in a policy agent has less impact than a resource agent to the availability and responsiveness of the resource mechanisms. The policy agents make requests of the standard resource agents. The standard policy agents can also be extended with custom implementations. In simple single hardware partition installations, the services of the operations partition 22 can be hosted in the command partition 20.

The partition definition/configuration objects are intended to be a purpose of customization. The partition policy objects are clients of the resource objects. The policy service provides configuration services for the presentation tier.

The operations partition user interface components are typically integrated within the operations partition 22. An exemplary implementation may use Hypertext Markup Language (HTML) Version 4, CSS, and Jscript. The operations partition user interface is principally a web interface implemented by an ASP.NET application that interacts with the policy service. The user interface interacts directly with the Partition Policy Service and indirectly with a partition database of the operations partition 22.

A .NET smart client may also be provided in the operations partition 22 to provide a rich client interface that may interact directly with the policy and resource services to present a rich view of current (enterprise) computing resources.

A resource service in the command partition 20 selects appropriate resources and creates a transaction to assign the resources to new partitions. The transaction is sent to the control partition 14 which saves transaction request to un-cached memory as a transaction audit log entry (with before and after images). The transaction is validated and applied to the resource database 33.

An audit log tracks changes due to transactions since the last time the resource database 33 was backed up (flushed to memory), thereby allowing transactions to be rolled back without requiring the resource database 33 to be frequently flushed to memory. The successful transactions stored in the audit log since the last resource database 33 backup may be reapplied from the audit log to restart a failed partition. A resource also may be recovered that has been reserved by a completed transaction. A transaction that has not completed has reserved no resource. The audit log may be used by the resource allocation software to rollback any partially completed transaction that survived the cache. It should be noted that a transaction that has not completed would have assigned some but not all resources specified in a transaction to a partition and the rollback would undo that assignment if it survived the cache.

I/O Partitions 16, 18

In the embodiment shown, a plurality of I/O partitions 16, 18 are active on a host node 10. I/O partitions 16, 18 allow multi-path I/O from the user partitions 26-28 and allow certain types of failures in an I/O partition 16, 18 to be recovered transparently. All I/O hardware in host hardware partitions is mapped to the I/O partitions 16, 18, These partitions are typically allocated a dedicated processor to minimize latency and allow interrupt affinity with limited overhead to pend interrupts that could occur when the I/O partition 16, 18 is not the current context. The configuration for the I/O partitions 16, 18 determines whether the storage, network, and console components share virtual partitions or run in separate virtual partitions.

Interconnect Service Partition 24

The interconnect service partition 24 coordinates inter-partition communication in conjunction with the control partition 14 and the command partition 20. Generally, and as discussed in further detail below, the interconnect service partition 24 defines and enforces policies relating to inter-communication of partitions defined in the command partition, and publishes an application programming interface (API) that acts as a command-based interconnect that provides the various guest partitions and I/O partitions 16, 18 intercommunication capabilities.

In some embodiments, the interconnect service partition 24 defines one or more security policies for each of the partitions included on all platforms, including the platform on which it resides. The interconnect service partition 24 implements permissions defined in such security policies to ensure that partitions intercommunicate only with those other partitions to which they are allowed to communicate. To that end, and as discussed in further detail below, the interconnect service partition 24 can define one or more security zones, each of which defining a "secure fabric" of platforms capable of intercommunication. As such, each security zone represents a virtual network of interconnected partitions. Each virtual network defined by the interconnect service partition 24 can be configured such that partitions within the secure fabric can intercommunicate, but partitions not included within that secure fabric are incapable of communicating with member partitions (e.g., unless both of those partitions are part of a different secure fabric). By defining a plurality of secure fabrics within each system, partitions are by default untrusted, or closed, rather than trusted, or open. That is, in the absence of defined secure fabrics, the partitions are assumed able to intercomnmuni-cate. However, with defined secure fabrics, only those partitions defined as part of a common secure fabric will intercommunicate, with partitions otherwise, by default, unable to communicate.

In addition, the interconnect service partition 24 defines one or more rights assignable to each secure fabric by way of the security policy, thereby allowing each secure fabric to have assigned a variety of types of rights or services to each partition or secure fabric. As further discussed below, secure fabrics including one or more guest partitions 26, 28 can be constructed in which a particular quality of service (e.g., reliability, uptime, or dedicated levels of processing and/or memory and/or bandwidth resources) is associated with a particular secure fabric. To ensure such service uptime, one or more different or redundant partitions can be dynamically added to or subtracted from the secure fabric.

User Partitions 26-28

The user partitions 26, 28 host the workloads that form the purpose of the virtualization system, and are described in normal domains for a user. These are the partitions that a user primarily interacts with. All of the other partition types are described in the system domains and are generally kept out of view of typical users.

System Startup

When the host computing system 10 is booted, the EFI firmware is loaded first. The EFI firmware boots the operating system associated with the control partition 14. The EFI firmware uses a standard mechanism to pick the boot target. Assuming the loader is configured and selected, boot proceeds as follows.

The loader allocates almost all of available memory to prevent its use by the firmware. (It leaves a small pool to allow proper operation of the firmware.) The loader then creates the resource database's memory data structures in the allocated memory (which includes a boot command channel predefined in these initial data structures). The loader then uses the EFI executable image loader to load the control monitor 34 and monitoring application into the control partition 14. The loader also jacks the boot monitor underneath the boot partition 12 at some point before the boot loader is finished.

The loader then creates transactions to create the I/O partition 16 and command partition 20. These special boot partitions are loaded from special replicas of the master partition definitions. The command partition 20 updates these replicas as necessary. The boot loader loads the monitor, and firmware into the new partitions. At this point, the boot loader transfers boot path hardware ownership from the boot firmware to the I/O partition 16. The I/O partition 16 begins running and is ready to process I/O requests.

The loader creates transactions to create a storage channel from the command partition 20 to an I/O partition 16, and a command channel 38 from the command partition 20 to the control partition 14. At this point the boot loader sends a final command to the control partition 14 to relinquish the command channel 38 and pass control to the command partition 20. The command partition 20 begins running and is ready to initialize the resource service.

The command partition operating environment is loaded from the boot volume through the boot storage channel path. The operating environment loads the command partition's resource service application. The resource service takes ownership of the command channel 38 and obtains a snapshot of the resources from the control partition's resource database 33.

A fragment of the policy service is also running in the command partition 20. This fragment contains a replica of the infrastructure partitions assigned to this host. The policy service connects to the resource service and requests that the 'boot' partitions are started first. The resource service identifies the already running partitions. By this time, the virtual boot partition 12 is isolated and no longer running at the most privileged processor level. The virtual boot partition 12 can now connect to the I/O partition 16 as preparation to reboot the command partition 20. If all I/O partitions should fail, the virtual boot partition 12 also can connect to the control partition 14 and re-obtain the boot storage hardware. This is used to reboot the first I/O partition 16.

The boot partition 12 remains running to reboot the I/O and command partitions 16, 20 should they fail during operation. The control partition 14 implements watchdog timers to detect failures in these (as well as any other) partitions. The policy service then activates other infrastructure partitions as dictated by the current policy. This would typically start the redundant I/O partition 18.

If the present host computing system 10 is a host of an operations partition 22, operations partition 22 is also started at this time. The command partition 20 then listens for requests from the distributed operations partitions. As will be explained below, the operations partition 22 connects to command partitions 20 in this and other hosts through a network channel and network zone. In a simple single host implementation, an internal network can be used for this connection. At this point, the distributed operations partitions 22 start the remaining partitions as the current policy dictates.

All available (not allocated) memory resources are owned by the special 'available' partition. In the example of FIGS. 1 and 2, the available partition is size is zero and thus is not visible.

Referring to FIG. 3, virtual channels are the mechanism partitions use in accordance with the invention to connect to zones and to provide fast, safe, recoverable communications amongst the partitions. For example, virtual channels provide a mechanism for general I/O and special purpose client/server data communication between guest partitions 26, 28 and the I/O partitions 16, 18 in the same host. Each virtual channel provides a command and I/O queue (e.g., a page of shared memory) between two partitions. The memory for a channel is allocated and 'owned' by the guest partition 26, 28. These queues are discussed in further detail below in connection with the interconnect Application Programming Interface (API) as illustrated in FIGS. 6-9. The control partition 14 maps the channel portion of client memory into the virtual memory space of the attached server partition. The control application tracks channels with active servers to protect memory during teardown of the owner guest partition until after the server partition is disconnected from each channel. Virtual channels can be used for command, control, and boot mechanisms as well as for traditional network and storage I/O.

As shown in FIG. 3, the control partition 14 has a channel server 40 that communicates with a channel client 42 of the command partition 20 to create the command channel 38. The I/O partitions 16, 18 also include channel servers 44 for each of the virtual devices accessible by channel clients 46, such as in the operations partition 22, interconnect service partition 24, and one or all guest partitions 26, 28. Within each guest virtual partition 26, 28, a channel bus driver enumerates the virtual devices, where each virtual device is a client of a virtual channel. The dotted lines in I/O partition 16 represent the interconnects of memory channels from the command partition 20 and operations partitions 22 to the virtual Ethernet switch in the I/O partition 16 that may also provide a physical connection to the appropriate network zone. The dotted lines in I/O partition 18 represent the interconnections to a virtual storage switch. Redundant connections to the virtual Ethernet switch and virtual storage switches are not shown in FIG. 3. A dotted line in the control partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices as well as runtime only devices. Except for I/O virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices. The device drivers convert device requests into channel commands appropriate for the virtual device type.

Additional details regarding possible implementation details of a partitioned, para-virtualization system, including discussion of multiple are discussed in U.S. Pat. No. 7,984,104, assigned to Unisys Corporation of Blue Bell, Pa., the disclosure of which is hereby incorporated by reference in its entirety. Example partitioning mechanisms, and additional details regarding partitioning within such a computing arrangement, are described in U.S. Provisional Patent Application No. 61/827,775, filed on May 28, 2013, as well as copending U.S. patent application Ser. No. 14/133,803 and Ser. No. 14/133,808, the disclosures of each of which are hereby incorporated by reference in their entireties.

II. Computing Systems Used to Establish SR-IOV Functionality

Figure 4:
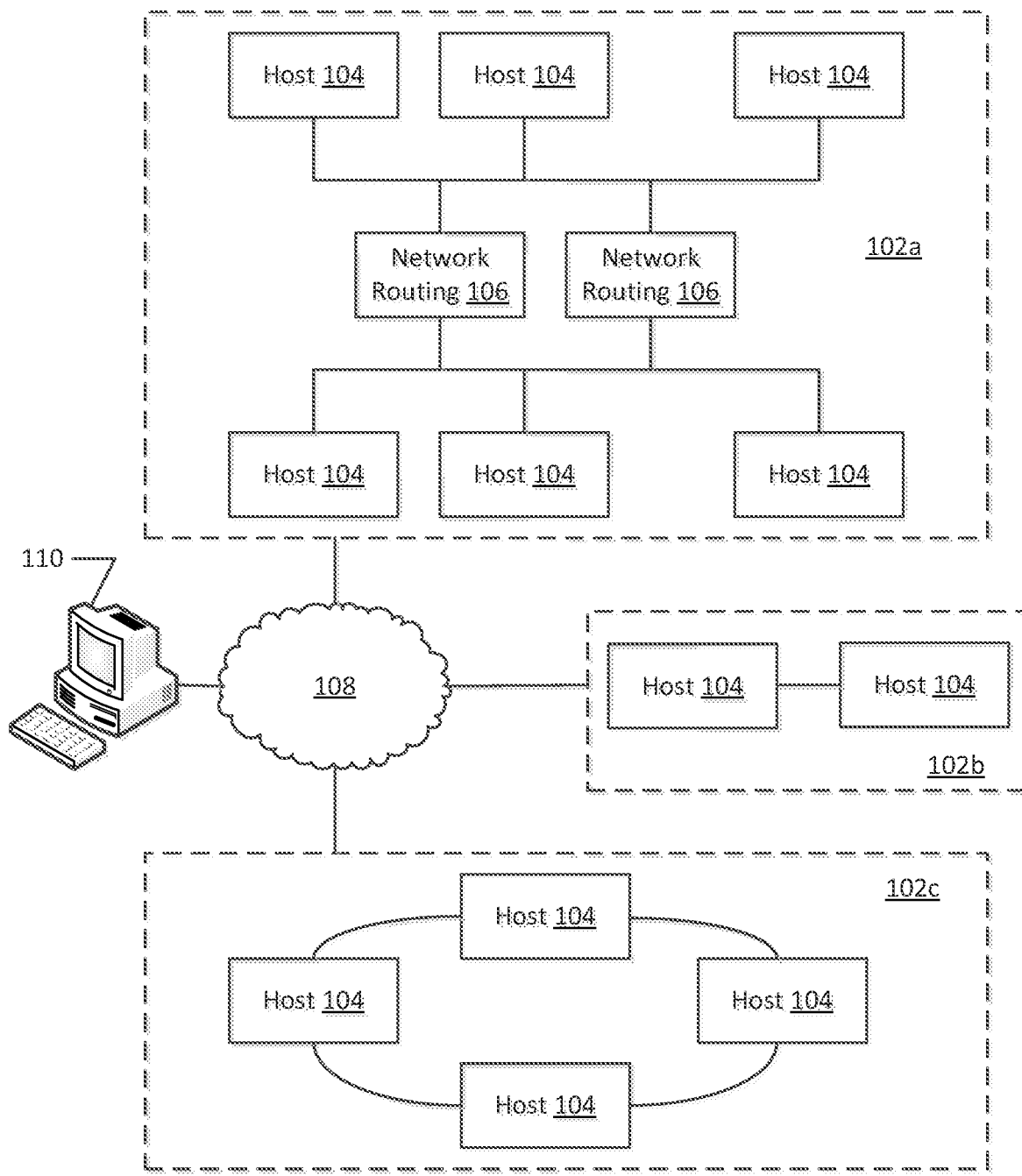
FIG. 4 illustrates a distributed multi-host system in which aspects of the present disclosure can be implemented.
Figure 5:
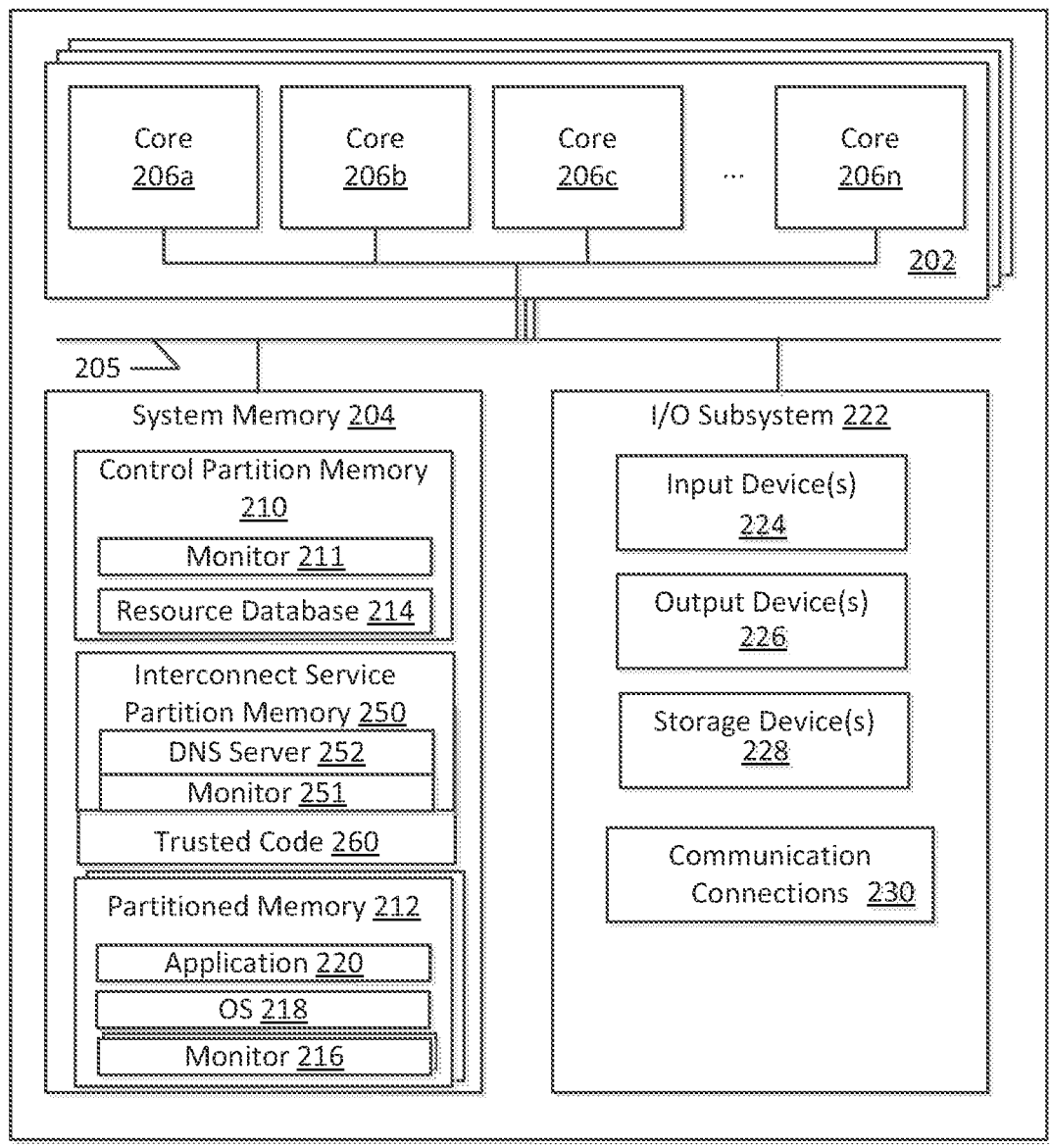
FIG. 5 illustrates an example block diagram of a host computing system useable to implement the para-virtualization systems of FIGS. 1-3, above.

Referring now to FIGS. 4-5, example arrangements of computing resources are illustrated for establishing a para-virtualization system across a plurality of host computing systems, such as host computing system s 10 of FIGS. 1-3, are shown. In particular, FIGS. 4-5 illustrate example computing resources in which the para-virtualization systems described herein can be implemented.

As illustrated in FIG. 4, a system 100 in which the para-virtualization systems of the present disclosure can be implemented is shown. The system 100 is, in the embodiment shown, distributed across one or more locations 102, shown as locations 102a-c. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 102a-c each include one or more host systems 104. The host systems 104 represent host computing systems, and can take any of a number of forms. For example, the host systems 104 can be server computing systems having one or more processing cores and memory subsystems and are useable for large-scale computing tasks. In one example embodiment, a host system 104 can be as illustrated in FIG. 5.

As illustrated in FIG. 4, a location 102 within the system 100 can be organized in a variety of ways. In the embodiment shown, a first location 102a includes network routing equipment 106, which routes communication traffic among the various hosts 104, for example in a switched network configuration. Second location 102b illustrates a peer-to-peer arrangement of host systems. Third location 102c illustrates a ring arrangement in which messages and/or data can be passed among the host computing systems themselves, which provide the routing of messages. Other types of networked arrangements could be used as well.

In various embodiments, at each location 102, the host systems 104 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 102a-c, a variety of communication technologies can also be used to provide communicative connections of host systems 104 at different locations. For example, a packet-switched networking arrangement, such as via the Internet 108, could be used. Preferably, the interconnections among locations 102a-c are provided on a high-bandwidth connection, such as a fiber optic communication connection.

In the embodiment shown, the various host system 104 at locations 102a-c can be accessed by a client computing system 110. The client computing system can be any of a variety of desktop or mobile computing systems, such as a desktop, laptop, tablet, smartphone, or other type of user computing system. In alternative embodiments, the client computing system 110 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 104 within the overall system 100 can be used; for example, different host systems 104 may have different numbers or types of processing cores, and different capacity and type of memory and/or caching subsystems could be implemented in different ones of the host system 104. Furthermore, one or more different types of communicative interconnect technologies might be used in the different locations 102a-c, or within a particular location.

Referring to FIG. 5, an example block diagram of a host computing system 200 useable to implement the para-virtualization systems of FIGS. 1-3, is shown. The host computing system 200 can, in some embodiments, represent an example of a host system 104 of FIG. 4, useable within the system 100. The host computing system 200 includes one or more processing subsystems 202, communicatively connected to a system memory 204. Each processing subsystem 202 can include one or more processing cores 206, shown as processing cores 206a-n. Each processing core can, in various embodiments, include one or more physical or logical processing units capable of executing computer-readable instructions. In example embodiments, the processing cores 206a-n can be implemented using any of a variety of x86 instruction sets, such as x86, x86-64, or IA64 instruction set architectures. In alternative embodiments, other instruction set architectures, such as ARM, MIPS, Power, SPARC, or other types of computing set architectures could be used.

In addition, each of the processing subsystems 202 can include one or more card-based processing subsystems including a plurality of sockets for supporting execution cores 206a-n, or alternatively can support a socket-based or mounted arrangement in which one or more execution cores are included on a single die to be mounted within the host computing system 200. Furthermore, in the embodiment shown, a plurality of processing subsystems 202 can be included in the host computing system, thereby providing a system in which one or more cores could be allocated to different partitions hosted by the same computing hardware; in alternative embodiments, a single processing subsystem including one or more processing cores 206a-n could be included in the host computing system 200, and that processing subsystem 202 could be implemented without separation from system memory 204 by a card-based implementation.

As illustrated, the system memory 204 is communicatively interconnected to the one or more processing subsystems 202 by way of a system bus 205. The system bus is largely dependent upon the architecture and memory speed support of the processing subsystems with which it is implemented; although example systems provide different frequencies and throughputs of such system buses, in general the bus system between processing subsystems 202 and the system memory is a low-latency, high bandwidth connection useable to rapidly retrieve data from the system memory 204. System memory 204 includes one or more computer storage media capable of storing data and/or instructions in a manner that provides for quick retrieval of such data and/or instructions by a corresponding processing core 206. In different embodiments, the system memory 204 is implemented in different ways. For example, the memory 204 can be implemented using various types of computer storage media.

In the embodiment shown, system memory 204 can be allocated to one or more partitions using the software described herein. In the example illustration shown, subsections of the system memory 204 can be allocated to a control partition section 210 and one or more memory partitions 212. The control partition section 210 includes a monitor 211, which in some embodiments can represent monitor 34. The control partition section 210 can also include a resource database 214 that tracks resources allocated to other partitions within the host computing system 200. This can include, for example, a listing of execution cores 206, capacity and location of system memory 204, as well as I/O devices or other types of devices associated with each partition. In example embodiments, the resource database 214 can correspond to database 33 of FIGS. 1-3.

In the embodiment shown, the system memory 204 includes memory partitions 212 which each are associated with different partitions formed within a host computing system 200. The memory partitions 212 can, in the embodiment shown, each include a monitor 216, an associated operating system 218, and one or more applications or workloads 220 to be executed within the partition. Since each memory partition 212 can be associated with one or more execution cores 206 in the resource database 214, the assigned execution cores can be used to access and execute the monitor software 216 as well as the operating system 218 and workloads 220.

It is noted that in some embodiments, the partition 212 may include multiple instances of the monitor software 216. This may be the case, for example, for partitions that have allocated thereto more than one execution core. For such cases, monitor software 216 may be allocated for and used with each execution core. Therefore, there may be more than one such monitor executing per partition, with each monitor handling various I/O, memory, or interrupt servicing tasks that may be issued with respect to that particular execution core. Each monitor supervises execution of software within a partition as allocated to a particular execution n core; accordingly, if a single partition has multiple execution cores, the operating system 218 may allocate execution of operating system tasks, or the workload(s) 220, to one or both of the execution cores. The host computing device includes an I/O subsystem 222 that includes one or more input devices 224, output devices 226, and storage devices 228. The input devices 224 can include, for example, a keyboard, a mouse, a pen, a sound input device, a touch input device, etc. Output device(s) 226 can include, for example, a display, speakers, a printer, etc. The aforementioned devices are examples and others may be used. Storage devices 228 store data and software instructions not directly accessible by the processing subsystems 202. In other words, the processing subsystems 202 perform an I/O operation to retrieve data and/or software instructions from the storage device 228. In various embodiments, the secondary storage device 228 includes various types of computer storage media. For example, the secondary storage device 228 can include one or more magnetic disks, magnetic tape drives, optical discs, solid state memory devices, and/or other types of computer storage media.

The I/O subsystem 222 further includes one or more communication connections 230. The communication connections 230 enable the computing device 1000 to send data to and receive data from a network of one or more such devices. In different embodiments, the communication connections can be implemented in different ways. For example, the communications connections can include a network interface card implementing an Ethernet interface, a token-ring network interface, a fiber optic network interface, a wireless network interface (e.g., Wi-Fi, WiMax, etc.), or another type of network interface. The communication connections 232 can also include an inter-system communication connection for direct data communication between computing systems, such as a Infiniband switched fabric communications link, or a Fibre Channel, PCI Express, Serial ATA, or other type of direct data communication link.

It is noted that, in some embodiments of the present disclosure, other arrangements of a partition may be included as well, providing various allocations of execution cores 206, system memory 204, and I/O devices 224, 226 within the I/O subsystem 222. For example, a partition may include zero or more execution cores 206; in the event that no processor is included with the partition, the partition may lack a monitor 216, and may instead of having an executable operating system 218 may instead include a library of commands accessible to one or more services partitions, for example useable to provide I/O or memory services to those other service partitions. Furthermore, a particular partition could be allocated access to a storage device 228 or communication connections 230.

It is noted that in the present embodiment an interconnect service partition 250 and a trusted code section 260 are maintained in the system memory 204. The interconnect service partition 250 maintains a monitor 251 providing virtualization services. The interconnect service partition 250 and trusted code section 260, described in further detail below in connection with FIGS. 6-13, host DNS server 252, which, as described in further detail below, allows for definition and management of partitions, including definition of levels of redundancy, quality of service (QoS), and/or distribution of partitions across host computing systems to ensure capabilities of those host computing systems are present and available for use by the hosted partitions. In addition, in some embodiments, one of the partitions, such as the interconnect service partition 250 or other partitioned memory 212 can host a fabric manager application, for example represented by application 220, which can be used to monitor and configure partitioned memory, for example by assisting to define one or more zone files (discussed in connection with FIGS. 6-7, below) which are managed by the DNS server 252 to monitor interconnection access to the host computing systems that include partitions included within the zone. Use of a DNS server allows for use of a DNSSEC security service as well, which allows the interconnect service partitions to control access across partitions.

It is noted that, in typical hypervisor arrangements, failures occurring in one execution core allocated to the partition result in failure of the partition overall, since the failure results in failure of the monitor associated with the partition. In connection with the present disclosure, partitions including multiple monitors can potentially recover from such failures by restarting the execution core and associated monitor using the remaining, correctly-executing monitor and execution core. Accordingly, the partition need not fail.

As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIGS. 4-5 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Although particular features are discussed herein as included within a host computing system 200, it is recognized that in certain embodiments not all such components or features may be included within a computing device executing according to the methods and systems of the present disclosure. Furthermore, different types of hardware and/or software systems could be incorporated into such an electronic computing device.

III. Non-Stop Fabric Arrangements and Methods of Implementation

Referring now to FIGS. 6-14, example arrangements of the para-virtualization systems of FIGS. 1-3 described above are discussed, as well as methods that are useable to establish and maintain a non-stop computing arrangement within a computing fabric are disclosed. The present disclosure provides additional details regarding example methods useable to provide a non-stop fabric and to provide security across secure fabrics, relative to U.S. Provisional Patent Application No. 61/827,775, filed on May 28, 2013, as well as copending U.S. patent application Ser. No. 14/133,803 and Ser. No. 14/133,808, the disclosures of each of which are hereby incorporated by reference in their entireties.

Figure 6:
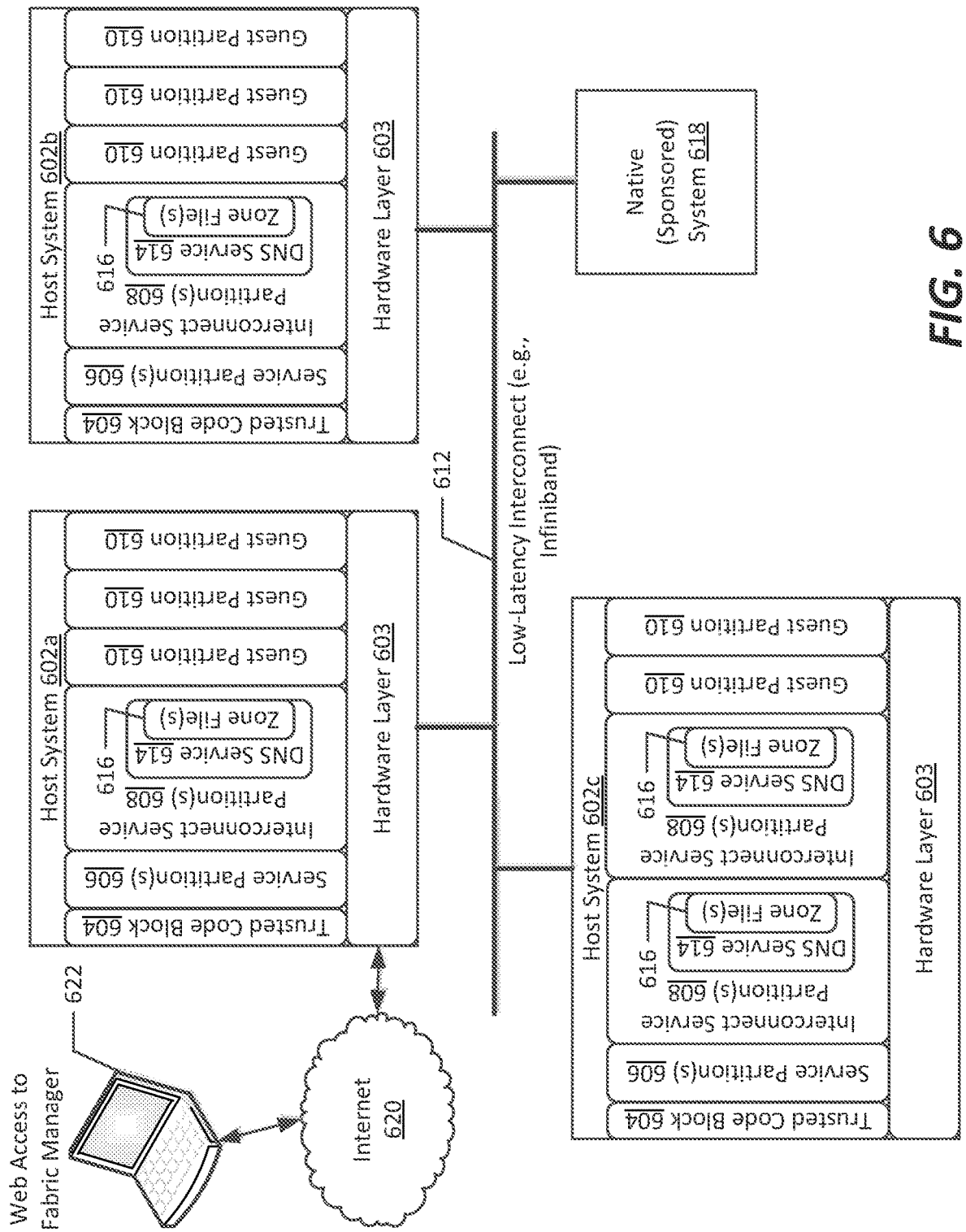
FIG. 6 illustrates a particular arrangement of the para-virtualization systems of FIGS. 1-3 above useable to configure and implement a non-stop computing fabric, according to an example embodiment of the present disclosure.

Referring first to FIG. 6, an example arrangement 600 representing one possible configuration of the para-virtualization systems of FIGS. 1-3, above, is shown, in which the non-stop fabric is implemented. In the embodiment shown, the arrangement 600 includes a plurality of host computing systems, or host platforms, seen as host computing systems 602*a-c*. In the example embodiment shown, each host computing system 602*a-c* (referred to generally as host computing systems 602). Each of the host computing systems 602 can be implemented using one or more computing systems, such as those disclosed in FIGS. 4-5, described above.

Each host computing system 602 includes a hardware layer 603 which supports a plurality of software layers, including a trusted code block 604, one or more service partitions 606, one or more interconnect service partitions 608, and optionally one or more guest partitions 610. Each host computing system 602 is also communicatively interconnected to the other host computing systems via an interconnect architecture 612, which can be, in various embodiments, a low-latency, high speed interconnect communications interface, such as a FibreChannel communications interface and protocol. Other communications interfaces may be used as well.

In the embodiment shown, the trusted code block 604 includes monitor code for each of the hosted partitions, as well as code used to interface to hardware, such as lowest-level, trusted code required for I/O operations, operations within particular memory address blocks, or other types of analogous operations in which trust is required for access to the hardware layer 603.

In the embodiment shown, the service partitions 606 include any of the service partitions described above in connection with FIGS. 1-3 or other special-purpose partitions not intended for hosting user applications, such as a boot partition, idle partition, control partition, command partition, operations partition, or I/O partition. Additionally, the one or more interconnect service partitions 608 can be used to control access to and communications via the low-latency interconnect architecture 612. As noted above in connection with FIG. 5, the interconnect service partitions 608 can host a DNS service 614, as shown, which is configured to generate and/or manage zone files 616 associated with the host computing system 602. Each DNS service 614 can act as a master or caching server for a zone, with zones being arranged in a hierarchy, for example at a root level, platform level, or custom level in which zones across a plurality of host platforms can be included. Additional details regarding definition of zones, and particular zone file examples, are provided in connection with FIG. 7, below.

As is illustrated in FIG. 6, each host computing system 602 may include one or more interconnect service partitions 608. If more than one such partition is included at a host computing system 602, the interconnect service partitions 608 may act as a backup of one another. For example, a first interconnect service partition of a host computing system 602 having multiple such interconnect service partitions 608, e.g., host computing system 602c, can be designated as a master partition with respect to the platform-level zone, and a second interconnect service partition may act as a caching server.

In the embodiment shown, the guest partitions 610 can be established on any of the host computing system 602. Although each host computing system 602 is illustrated as including a plurality of such guest partitions, it is recognized that any number of guest partitions may be present. Each guest partition 610 may be included in one or more zones. In typical embodiments, all guest partitions will be included in a root zone, and all guest partitions in a particular host computing system 602 will be included in a platform zone. Additionally, a guest partition 610 may be included in one or more customized zones configured by an administrative user, for example to define interconnection capabilities among the host computing systems.

In the embodiment shown, a sponsored system 618 can also be included in the overall arrangement, and communicatively connected to the host computing systems 602 by the interconnect architecture 612. The sponsored system 618 may be a computing system in which applications are natively hosted (e.g., lacking the para-virtualization technologies discussed herein, and in particular lacking the service partitions as discussed above). In the example embodiments discussed herein (and illustrated in the below examples), the sponsored system 618 can be included in one or more zones despite lacking an interconnect service partition in which a DNS service can be hosted. As such, one of the host computing systems 602 can be configured to host the sponsored system 618, such that it, in effect, operates as if a guest partition of the sponsoring host computing system.

In addition, in the embodiment shown, one or more of the host systems 602 can be communicatively connected to the internet 620. A remote system 650 can be used to view configuration details of the arrangement 600, and to administer the non-stop fabric. In some example embodiments, a fabric manager application can be hosted, for example either within a guest partition 610 or within a sponsored system 618, to present to the user of the remote system 650 a user interface for defining zones, assigning computing systems and partitions to zones, defining quality of service (QoS) issues, defining redundancy and rules in the event of failure of particular partitions, dedicated resources associated with the various partitions, or other configuration details.

In operation, an administrative user may use a remote system 650 to access a fabric manager to define one or more zones, or one or more partitions. In some embodiments, creation of a new partition may automatically add that partition to one or more zones, such as a root zone and a platform zone on the platform on which the partition is configured to reside. Additionally, the partition may be added by the administrative user (or automatically by the fabric manager in response to a request by the administrative user) to one or more zones. Configuration can also include defining a level of redundancy for a particular partition or zone, such that a guest partition may be cached within a zone on the same or a different host computing system, or an interconnect service partition may be cached at a different host computing system to ensure continued operation in the event of a failure of hardware or within the interconnect service partition acting as the master interconnect service partition hosting a zone file. In the event of a failure of one or more partitions, if such redundancy exists within a zone, a remaining interconnect service partition (if such a partition failed) can take over and/or activate a different partition as the active, non-cached version of the partition to be executed. An example of such fail-over among interconnect service partitions is discussed in further detail below in connection with FIGS. 9A-9C.

It is noted that, although not all aspects of the para-virtualization systems of FIGS. 1-3 are disclosed specifically in FIG. 6, in various embodiments, each of the host computing systems disclosed can incorporate any of a variety of other types of partitions or features discussed above.

Figure 7:
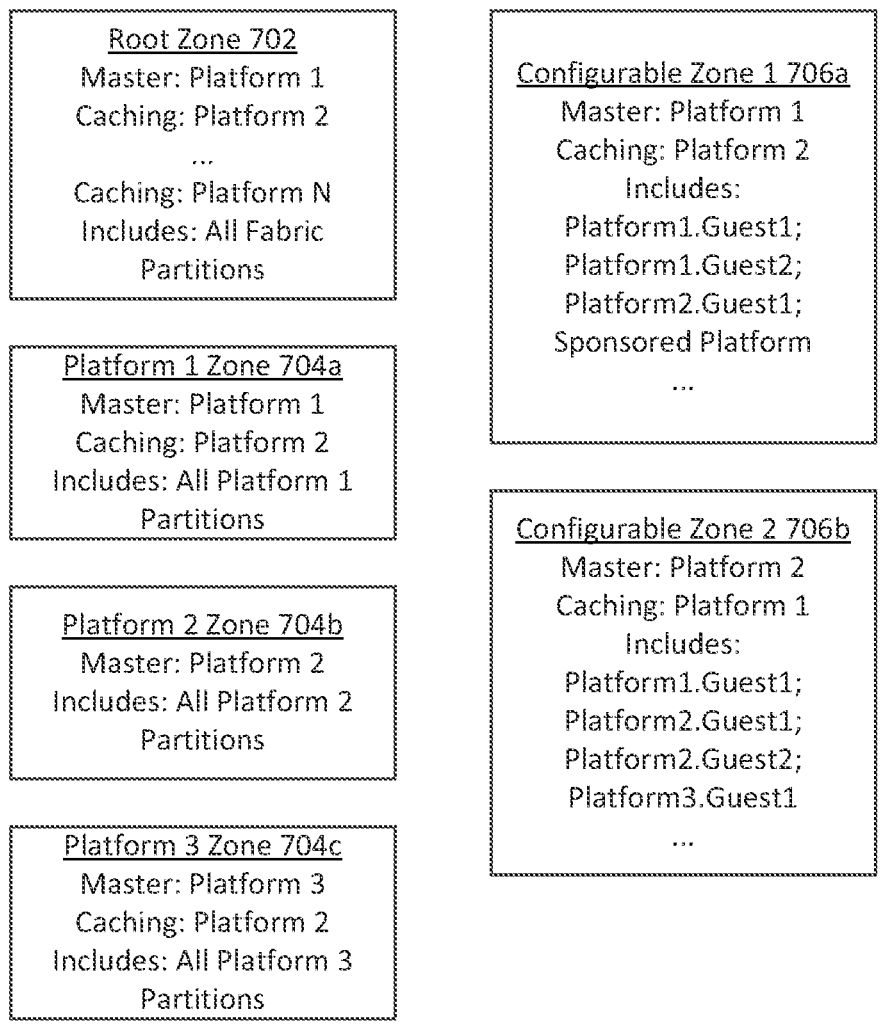
FIG. 7 illustrates a set of zone definitions useable within the arrangement of FIG. 6 to provide security and to define quality of service features within the non-stop computing fabric shown thereon, according to an example embodiment.

Referring now to FIG. 7, a set of zone definitions 700 is illustrated that are useable within the arrangement of FIG. 6 to provide security among partitions and to define quality of service features within the non-stop computing fabric discussed herein.

In the embodiment shown, the zone definitions 700 include a root zone definition 702 that includes a definition of a master interconnect service partition acting as a master for the overall fabric, as well as one or more caching interconnect service partition defining the platform that acts as a caching server for the root-level system. The root zone definition 702 includes each of the fabric partitions present within the non-stop fabric, such as each partition of FIG. 6.

In the embodiment shown, the zone definitions also include one or more platform zones 704a-c, each of which is established in association with a platform included within the non-stop fabric. As illustrated in FIG. 7, platform zones 704 may or may not have a defined caching server that is provided by a different platform; in the example of platform zone 704a and 704c, Platform 2 represents a caching server; in the example of platform zone 704b, there is no caching server. As such, whether such a caching server is configured as included is optional.

Furthermore, as illustrated, one or more user-definable zones 706a-b may be included within the non-stop fabric, and define a collection of partitions on different platforms that can freely intercommunicate, as well as the platform designated as the master platform (via its primary interconnect service partition) and any caching platforms that may be indicated as well. In the embodiment shown, the user-definable zones 706 can define a platform having master or caching server access to the platform, and as such define an interconnect service partition to act as the DNS server service master and/or caching service. The user-definable zones 706 can be distributed across host computing platforms 602, providing distributed computing arrangements in which partitions within a zone can be configured to intercommunicate, and therefore two particular platforms must be set to be capable of communication, for example by setting port permissions by the interconnect service partition across low-latency interconnect 612.

In connection with the present disclosure, the zone definitions that are received can be received at a fabric manager, such as the fabric manager described in connection with FIG. 6, and which may be hosted within a service partition or guest partition of the non-stop fabric 600. Furthermore, and also in connection with the present disclosure, the zone definitions can be included in one or more zone files that can be shared among DNS server service instances in interconnect service partitions of the various host computing systems used to implement the non-stop fabric as described. In example embodiments, additional information can be included in such zone files. Zone files can be constructed as text files and stored/managed using DNS servers, which also implement DNSSEC security, as noted herein, to provide key-based security for shared communications across a defined zone but preventing communications between partitions in different, non-overlapping zones. Settings included in such zone files, because they are managed at the interconnect service partition, can be populated into various hardware systems, for example to specifically define other host computing systems that can communicate with a particular host computing system based on the membership of any hosted partitions within a zone, and the other partitions within the same zone.

By way of example, and continuing the example configuration of zones as set forth in FIG. 7, a set of zone files implementing zones within the example non-stop fabric of FIG. 6 are discussed herein. As an initial manner of constructing such a zone file, each host computing system that is included in a non-stop fabric will be configured with a trust anchor, which is the equivalent of a DS record in a DNS server, and NS addresses for the fabric. Such a trust anchor could be instantiated as follows:

```
.test
; pseudo parent zone that defines the trust anchor for the federated fabric
island of trust
$ORIGIN test. ;designates the start of a parent zone
corp1   86400   IN   DS   60485   5   1
2BB183AF5F22588179A53BOA   98631F
ADIA292118
```

A master file for a corporation's fabric tied to the trust anchor could also be established, and can define a root zone (e.g., zone 702) including subdomains and master and caching servers for the fabric:

```
corp 1.test
; master file fur the 'corp1.test' federated fabric root zone
; can also encompass the single sub domain 'fitbrie1.corp1.test') in a
trivial federation
of one fabric
$ORIGIN corp1.test. ; designates the start of this zone :file in the
na.rrx:space
$TIL 1h ; default expiration time of an resource records without their own
TTL value
@ IN SOA Interconnect.1.platfurmusername.corp1.test. 2014062100 1d
2h4w Ih
86400 IN DNSKEY 256 3 5 xxx yyy zzz ; key of federation
NS Interconnect.1.platform
NS Interconnect.2.platform
; the root zone includes subdomains fur distinct physical and
logical fabric
namespaces
$INCLUDE fabrics
```

Furthermore, a master file for a first domain logical fabric zone can be established that uses two platforms as master and caching servers and is coextensive with the root zone can be instantiated:

```
domain1.corp1.test
; master file for the 'domain1.corp1.test' logical fabric zone
; For 3.0 timeframe this can/will be combined into the corp1.test
federation root zone
```

-continued

```
$ORIGIN domain1.corp1.test. ; designates the start of this zone file in the
namespace
$TIL 1h ; default expiration time of an resource records without their own
TIL value
@ IN SOA Interconnect.1.platfurmusername.domain1.corp1.test.
2014062100 1d 2h4w 1h
86400 IN DNSKEY 256 3 5 xxx yyy zzz; key of fabric
NS Interconnect.1.platform.fabric1.corp1.test
NS Interconnect.2.platform.fabric1.corp1.test
; the zone includes subdomains fur distinct namespaces
; logical fabrics contain services and systems
$INCLUDE services
$INCLUDE systems
```

In addition to such domain-level zones, one or more partition-level zone entries can be included in a master file for a root zone can be provided. An example partition level zone file implementing such a zone may appear as follows:

```
partitionfubrlc1.corp1.test
; include file 'partitions' fur physical fabric (root) zone
$ORIGIN partitionfabric1.corp1.test.
; authorized partitions in 'fabric1.corp1.test'
; NS defines host platfom(s) of the partition
; OS defines partition membership in the fabric
; numeric names are fabric partition numbers (fabric platform number *
256 + platform partition number)
1.1 DS hash-g1
; partition 1 of PEPP platform 1
NS Interconnect.1.platfurm.fubric1.corp1.test.
NS Interconnect.2.platfurm.fubric1.corp1.test.
Guest-1A CNAME 1.1
;
1.2 DS hash-g2
; partition 1 of PEPP platform 2
NS Interconnect.2.platform.fabric1.corp1.test.
NS Interconnect.3.platform.fabric1.corp1.test.
Guest-2B CNAME 1.2
2.2 DS hash-g3
; partition 2 of PEPP platform 2
NS Interconnect.2.p1alfunnmbric1.corp1.test.
NS Interconnect.3.p1alfunnmbric1.corp1.test.
Guest-3B CNAME 2.2
1.17 DS hash-4353
; (partition 1 of) NEPP platform 17
NS Interconnect.1.platform.fabric1.corp1.test.
NS Interconnect.2.platform.fabric1.corp1.test.
; NEPP shares NS with PEPP
OracleDb1 CNAME 1.17
```

```
Guest-1A.partitionfabric1.corp1.test
; master file fur the partition 1-1 zone
$ORIGIN 1.1.partition.fabric1.corp1.test. ; designates the start of this zone
file in the namespace
$TIL Ih; default expiration time of all resource records without their own
TTL value @ IN SOA Interconnect.1.p1atform.fabric1.test.
username.fabric1.corp1.test. 2014062100 1d 2h
4w 1h
86400 IN DNSKEY 256 3 5 xxxxxxxxxxxxxx yyy zzz; key of partition
1.1
NS Interconnect.1.platform.fabric1.corp1.test.
NS Interconnect.2.platform.fabric1.corp 1. test.
CNAME FM-LAN
FM-LAN A 172.29.1.1
HD-LAN A 172.30.1.1
IP-LAN A 172.31.1.1
IB1-LAN A 10.31.1.33
IB2-LAN A 10.31.1.97
_ 443._tcp.FM-LAN IN TLSA (0 0 1 xxxI yyyl )
```

A guest partition can be defined within the root zone as illustrated below:

Other partitions can be similarly defined. For example, regarding platform-level zones, within the root zone, the platforms will also be defined, and will include definitions of backup platforms for each platform membership within a fabric, and lists authorized platforms within the fabric. The platform-level configuration details within a root zone file can include authorized interconnections among platforms, for example to assist in mapping between platforms for purposes of communication via the low-latency interconnect, as well as to define backup platforms in case of failure of the existing platform.

At the platform level, a platform zone file can define a zone, as well as a default expiration time of records within the zone, a key used for communications within the platform-level zone, interconnections useable by the platform, including connections to a fabric manager, a partition management controller, a platform interconnect gateway, and various other partition monitoring and management services:

```
1.platform.fabric1.corp1.test
; master file for the platform 1 zone
$ORIGIN 1.platform.fabric1.corp1.test. ; designates the start of this zone file in the namespace
$TIL 1h ; default expiration time of an resource records without their own TIL value
@ IN SOA Interconnect username.filbric1.corp1.test 2014062100 1d 2h4w 1h
86400 IN DNSKEY 2563 5 (AQOeiiROGOMYkDshWoSKz9Xz
tWJr 1A Ytsrnx3 TGkJaNXVbfil2pHm822aJ5iI9BMzNXxeYCrnZ
DRD99WYwYqUSdjMmmAphXdvx egXdlM5+ X70rzKBaMbCVdFLU
Uh6DhweJBjEVv512wwjM9Xzc nOf+EPbtG9DMBmADjFDc2w/r
ljwvFw) ; key of platform 1
NS Interconnect
NS Interconnect.2.platform.fabric1.corp1.test.
pmc A 172.29.1.254 ; IPv4 address for platform management controller
s-Par A 172.29.1.253 ; IPv4 address fur partition management controller
Interconnect A 172.29.1.250 ; IPv4 address for platform interconnect gateway
ns CNAME Interconnect ; ns is an alias fur Interconnect service partition
www CNAME s-Par; alias for partition management controller
FM-LAN.Interconnect CNAME Interconnect
HD-LAN .Interconnect A 172.30.1.250
IP-LAN .Interconnect A 172.31.1.250
IB1-LAN.Interconnect A 10.31.1.154
IB2-LAN .Interconnect A 10.31.1.186
_ 443._tcp.s-Par SRV 0 1 0 s-Par
; DANE authentication/authorization for platfunn services
_ 443._tcp.pmc IN TLSA (001 xxx yyy)
_ 443._tcp.s-Par IN TLSA (001 d2abde240d7cd3ee6b4b28c54df034b9 7983ald16e8a410e4561cbl06618e971 )
_ 443._tcp.Interconnect IN TLSA (001 xxx3 yyy3 )
$ORIGIN 1.29.172.IN-ADDRARPA
1 PTRFM-LAN.1.1.partitionfilbric1.corp1.test
250 PTRFM-LAN.Interconnect
253 PTRFM-LAN.s-Par.1. platform.fabric1.corp1.test
254 PTRFM-LAN.PMC.1. platform.fabric1.corp1.test.
```

In addition to the root and platform level zones, other types of zones can be defined as well. For example, in some cases, services zones can be defined to allow for service connections among partitions. Additionally, system-level zones could be defined.

In some cases, and as described herein, zone files can be used to defined one or more secure fabrics. The secure fabrics included in a non-stop fabric defines the list of known secure fabrics and associated policies. The Interconnect endpoints defined in the partition zone instances contain list of (PTR, SRV, TXT) resource records. The existence of these resource records is the authorization for membership in each associated Secure fabric.

```
fabric.fabric1.corp1.test
; include file "fabrics" for fabric root zone
$ORIGIN fabric.fabric1.corp1.test
; authorized secure fabric 'fabric1.corp1.test'
; numeric names are secure fabric (VLAN) numbers
1 TXT Desc='Management LAN"
; partitions hosting full members of secure fabric
PTR 253.platform.fabric1.corp1.test
PTR 252.platform.fabric1.corp1.test
FM-LAN CNAME 1
2 TXT Desc="File Storage LAN"
; partitions hosting full members of secure fabric
PTR 1.platform.fabric1.corp1.test
PTR 2.platform.fabric1.corp1.test
File-LAN CNAME2
3 TXT Desc="Block Storage LAN"
; partitions hosting full members of secure fabric
PTR 1. platform.fabric1.corp1.test
PTR 2.platform.fabric1.corp1.test
Storage-LAN CNAME3
4 TXT Desc="Installation Images LAN"
Image-LAN CNAME 4
5 TXT Desc= "Default IP LAN"
1P-LAN CNAME 5
```

In addition, further information for other types of partitions or equivalents, such as sponsored systems, can be included in zone files as well. IP subnet information can be provided for purposes of reverse lookup of the various partitions within the zone.

Although not explicitly depicted above, it is noted that one or more additional features may be included within a particular zone. For example, even in a root zone, the root zone will include not just platform definitions of the platforms authorized for inclusion in that zone, but will also include a key signing key and a zone signing key. Such keys, which can be generated using public/private key pairs, are used to sign and secure keys used for communication within each of the zones, as well as to secure communications within the zones themselves. Use of the keys results in a signed zone file and a separate file that represents the signature of the signed zone file and which can be maintained in a parent zone (e.g., in a root from a platform, etc.)

Furthermore, it is noted that in some cases, platforms that do not have control over the root zone may need to query the root zone, for example to investigate regarding the presence of other partitions within the overall system. In this case, a hints zone file could also be created to indicate which servers to query/cache when the local platform lacks authority over a requested zone which is not included within the local platform's cache.

Figure 8:
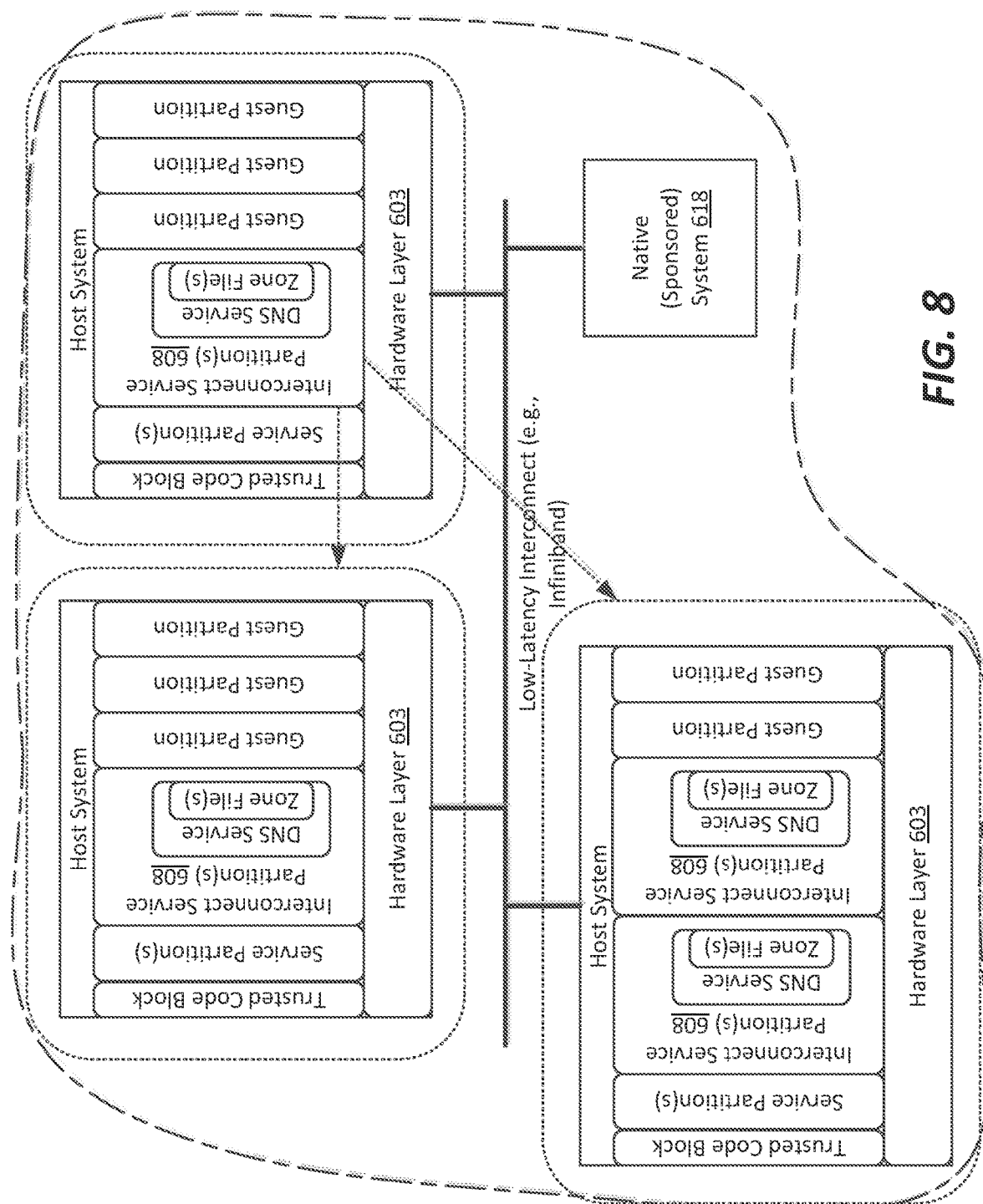
FIG. 8 illustrates root and platform zones defined in the set of zone definitions of FIG. 7.

Overall, use of the DNS server services as hosted within interconnect service partitions provides a number of benefits to the non-stop fabric as described herein. For example, the various configuration files can be managed by the same partition that controls access to the low-latency interconnect providing communications between platforms. Using the definitions included in zone files, an administrative user can control such interconnections, for example for security purposes (e.g., preventing unauthorized use/access) but also for preserving quality of service, by preventing overloading of resources onto platforms lacking sufficient resources. Referring now to FIGS. 8-9, various configurations of zones are illustrated, based on the zone definitions of FIG. 7, and implemented using the zone files discussed previously. The implementations of zones as illustrated in FIGS. 8-9 represent mechanisms for ensuring the non-stop computing fabric remains available at a desired quality of service based on an administratively-set security and service levels, for example using a fabric manager. For purposes of illustration, the zone implementations are illustrated in connection with the example non-stop fabric arrangement 600 previously described in connection with FIG. 6.

Referring first to FIG. 8, an example depiction of root and platform zones defined in the set of zone partitions is illustrated herein. As illustrated in FIG. 8, a root zone 702 encompasses all platforms and systems within the non-stop fabric arrangement 600, while separate platform zones 704*a-c* correspond to host computing systems 602*a-c*, and provide a locally-secured grouping of partitions useable for quick access and local tracking of partitions. In the embodiment shown, the sponsored system 618 is not included within any of the platform zones 704*a-c*; however, in alternative embodiments, the sponsored system 618 could be sponsored by and incorporated into any of the platform zones 704*a-c*.

Figure 9A:
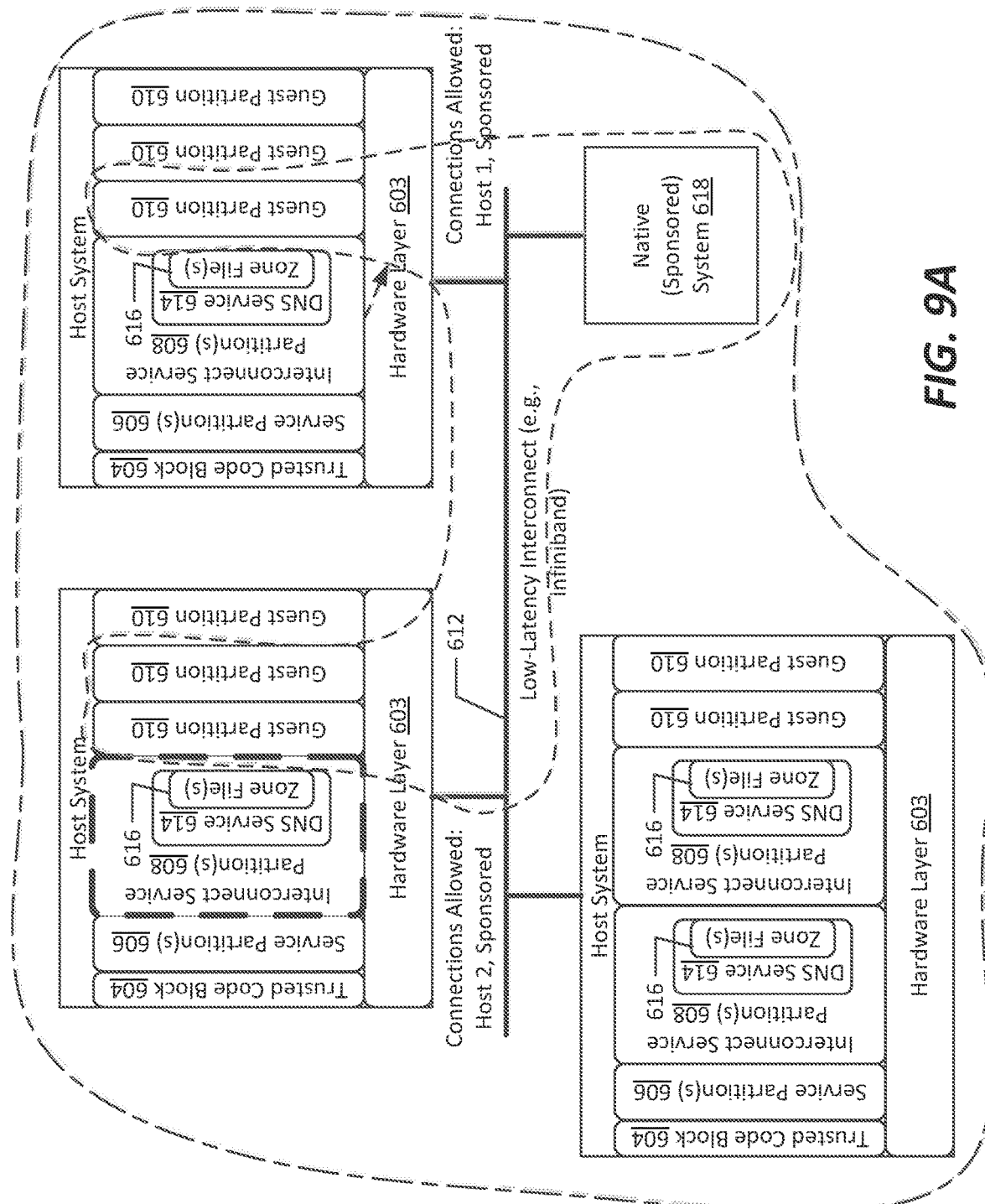
FIGS. 9A-9C illustrate operation of an example zone defined to extend across host platforms, as well as methods of failover handling useable to maintain operation of the partitions within the non-stop computing fabric, according to example embodiments.
Figure 9B:
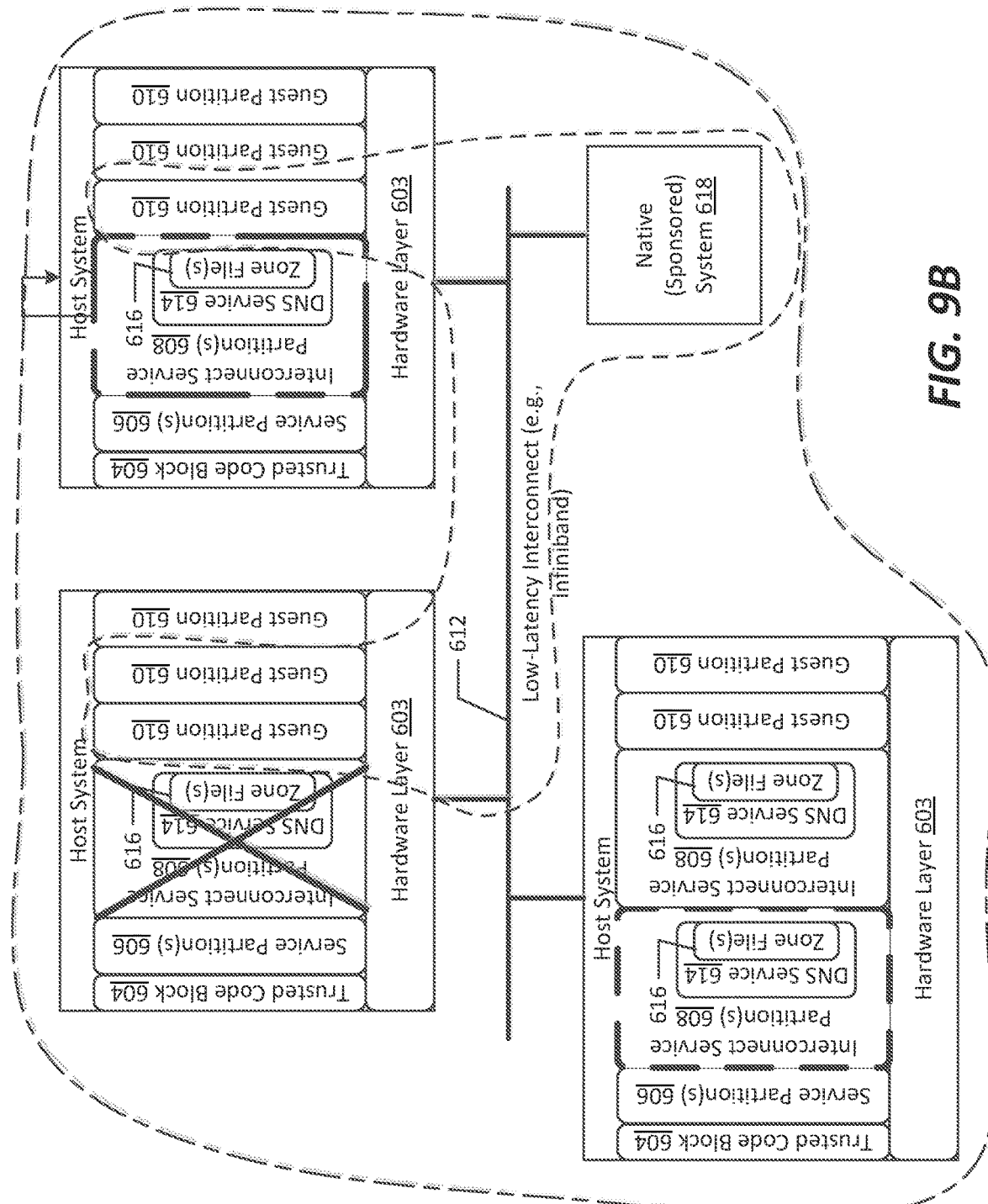
Figure 9C:
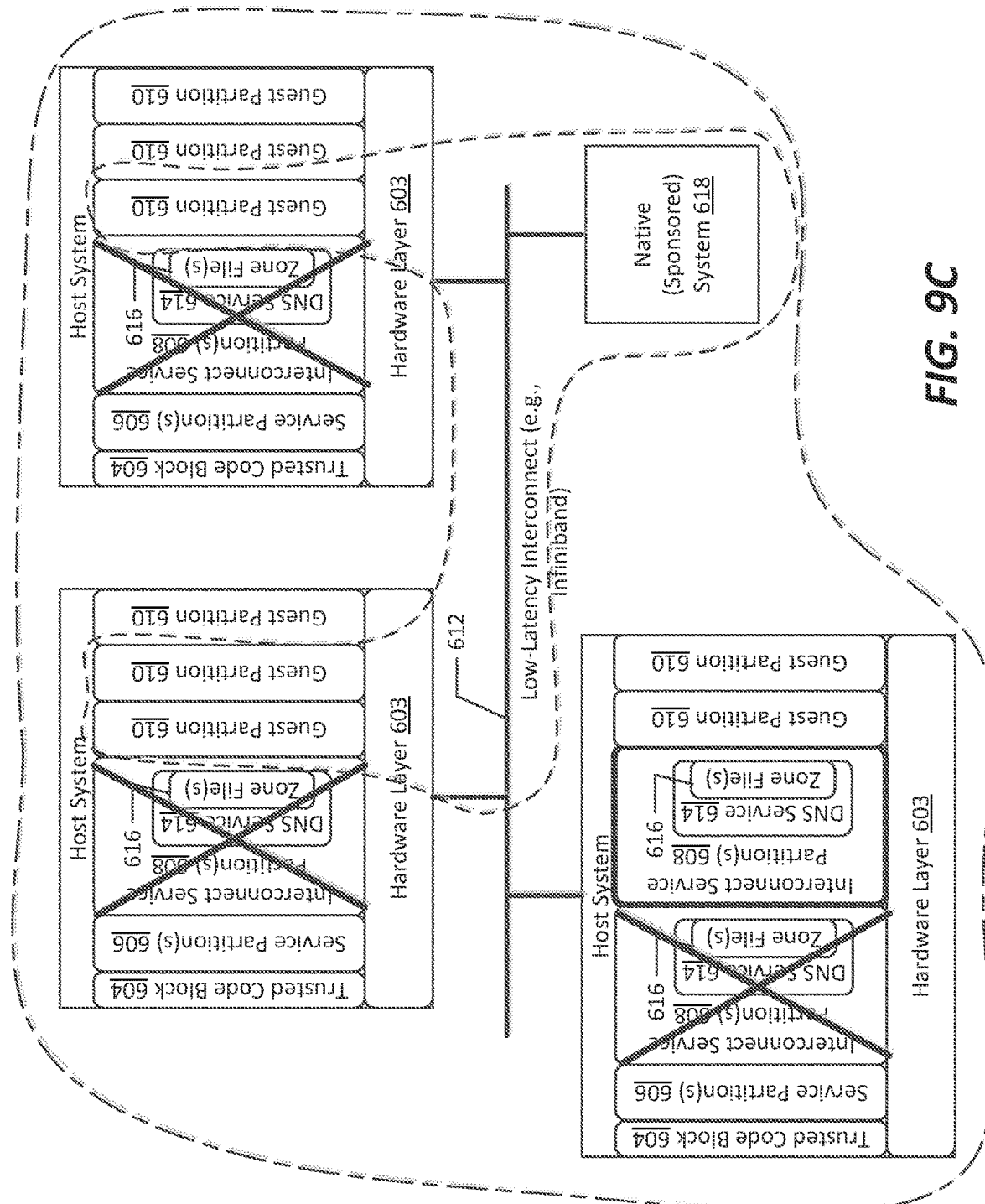

FIGS. 9A-9C illustrate operation of an example zone defined to extend across host platforms, as well as methods of failover handling useable to maintain operation of the partitions within the non-stop computing fabric, according to example embodiments. These figures also reflect zones as would be provided within the non-stop computing fabric arrangement 600 of FIG. 6, described above.

In the embodiment shown in FIG. 9A, a first secure fabric zone is depicted, for example based on the zone definition 706*a* of FIG. 7. In the embodiment shown, two guest partitions from a first host computing system 602*a*, a guest partition 610 from a second host computing system 602*b*, and a sponsored system 618, can be included within the zone. As such, for example, an interconnect service partition 608 of a first host computing system 602*a* may configured its connection via the low-latency interconnect 612 to allow connections to the second host system 602*b* and from the sponsored system 618, without providing communication connection from the third host system 602*c*, since no partitions overlap within the same zone. Similarly, the second host system 602*b* allows connections to first host computing system 602*a* and sponsored system 618, but not host computing system 602*c*. In alternative zone definitions or arrangements, a different combination of partitions could be defined as within a common secure fabric zone, and as such different connections may be allowed. Additionally, a plurality of different secure fabrics can be included.

In example embodiments, to accomplish the platform interconnection controls described herein, the interconnect service partitions on one or more designated platforms generate a partitions file based on the information available in the distributed repository. Platform and partition authorizations determine the actual secure fabric assignments to the platform physical ports of the low-latency interconnect 612. The platform physical ports have access only to the authorized secure fabrics. The authorized secure fabrics support membership roles (GUID=FULL, or GUID= LIMITED, as opposed to ALL=BOTH). The total number of secure fabrics is limited by the number of secure fabrics (and membership roles) referenced on the platform in the fabric. Individual platforms do not have access to all secure fabrics, so the limited secure fabric membership roles per platform physical port does not limit the total number of secure fabrics. Secure fabric membership roles referenced by partitions of a single platform also do not contribute to the limit for other platforms. Of course, for discovery purposes, in some embodiments, every interconnect service partition can obtain and validate platform authorization records for the entire fabric.

Referring to FIGS. 9B-9C, additional details regarding mechanisms for managing failures within an overall non-stop fabric are discussed which allow for preserving operation of user workloads and partitions within the fabric. As seen in FIG. 9B, an interconnect service partition 608 of the first host computing system 602*a* is failed. The interconnect service partition 608 was a master of both the root zone 702 and the secure fabric 706*a*. As such, caching servers of both zones are then re-assigned to become masters, with a first interconnect service partition 608 of the third host computing system 602*c* becoming the master for the secure fabric (shown in regular dashed lines), and the interconnect service partition 608 of the second host computing system 602*b* becoming the master for the root zone (shown in alternative elongated dashed lines).

In FIG. 9C, the master interconnect service partitions of FIG. 9B both have failed. In this arrangement as shown, a backup interconnect service partition 608 of the third host computing system 602*c* is defined as the further caching service, and becomes a master for both the root zone 702 and the secure fabric 706*a* (shown in bold, solid lines). In this arrangement, the backup interconnect service partition 608 of the third host computing system 602*c* may continue as the master for both zones until another interconnect service partition is successfully restarted or reinstantiated.

Of course, if no further master is defined in the zone files and backup interconnect service partition 608 of the third host computing system 602*c* fails as well, an overall system failure would occur. However, because the overall system is configured to provide adequate numbers of caching servers, or backups, to the master for that zone, it is unlikely that this would occur. Furthermore, because the master and caching systems are virtualization software systems, redundant servers can be instantiated on one or more different host computing systems, and are typically attempted to be restarted after failure; as such, it is unlikely that any particular partition would not be available in the rare event of a failure of more than one such interconnect service partition.

Figure 10A:
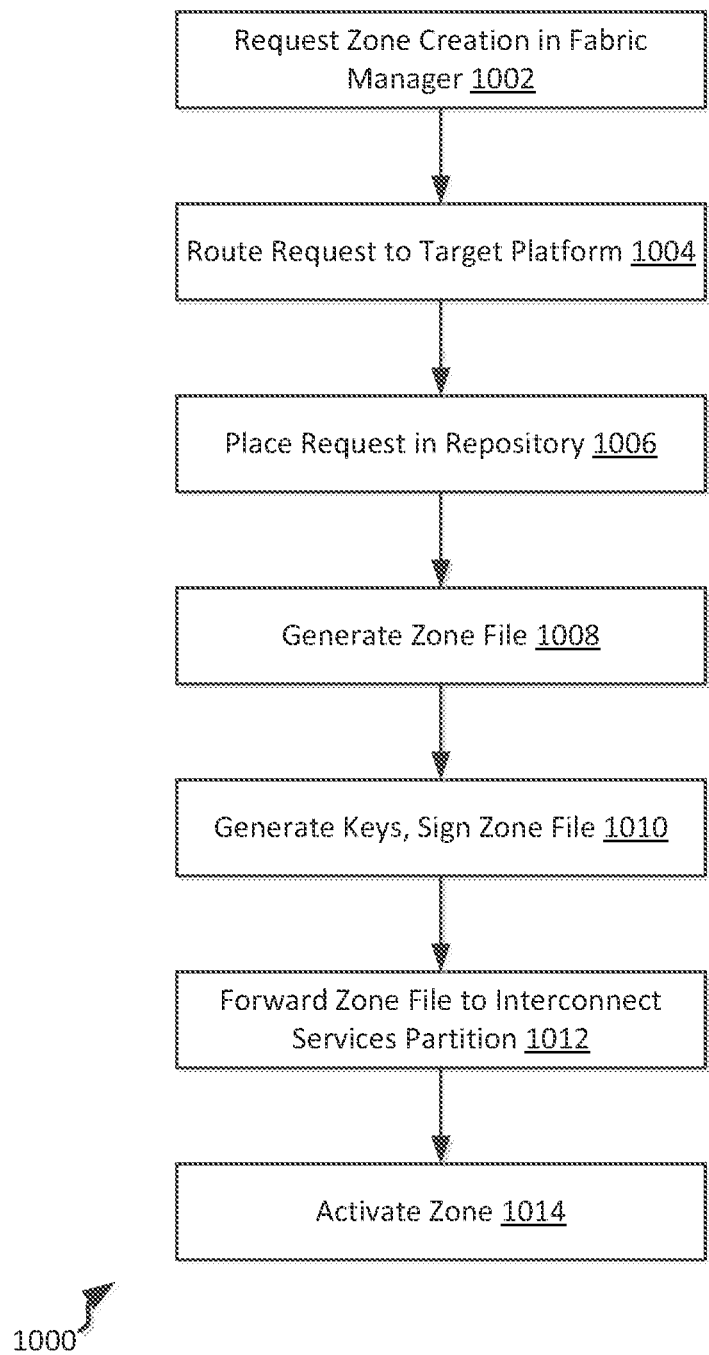
FIG. 10A illustrates a flowchart of a method of defining a zone within a non-stop computing fabric, according to an example embodiment.

FIG. 10A illustrates a flowchart of a method 1000 of defining a zone within a non-stop computing fabric, according to an example embodiment. The method 1000 can be performed, for example, using the para-virtualization systems of FIGS. 1-3, above, and in particular to implement the non-stop fabric described in FIGS. 6-13 herein. In the embodiment shown, the method 1000 includes a zone creation request operation 1002 in which a zone creation request is received, for example at a fabric manager of a non-stop computing fabric, such as was discussed above in connection with FIG. 6. A forwarding operation 1004 forwards the zone creation request to a target platform that will act as a master for that zone, and the zone creation request is stored in a repository at a storage operation 1006.

In the embodiment shown, the target platform, at zone file generation operation 1008, will generate a zone file, for example in a control or command partition. It is noted that, in addition to creation of the new zone file, one or more other zone files may need to be reviewed and/or modified. Accordingly, the zone file generation operation 1008 may also include querying other zone files (e.g., a root zone file) to determine if the new zone should be included within those parent or related zone files.

In the embodiment shown, a signature operation 1010 will generate a zone signing key and a key signing key, which will be used to sign the zone file to verify its identity as the true zone file for the zone (to prevent security breaches by modification of a zone file). A forwarding operation 1012 will then forward the zone file to the interconnect services partition of the target platform, which will manage and store the zone files and keys used to sign the zone files. An activation operation 1014 will activate the zone. This can include, for example, the interconnect services partition defining port access permissions or other rules associated with a quality of service defined within the zone file or otherwise defined in the fabric manager, and limiting communication access to other systems not requiring access to the host systems implementing the zone.

Figure 10B:
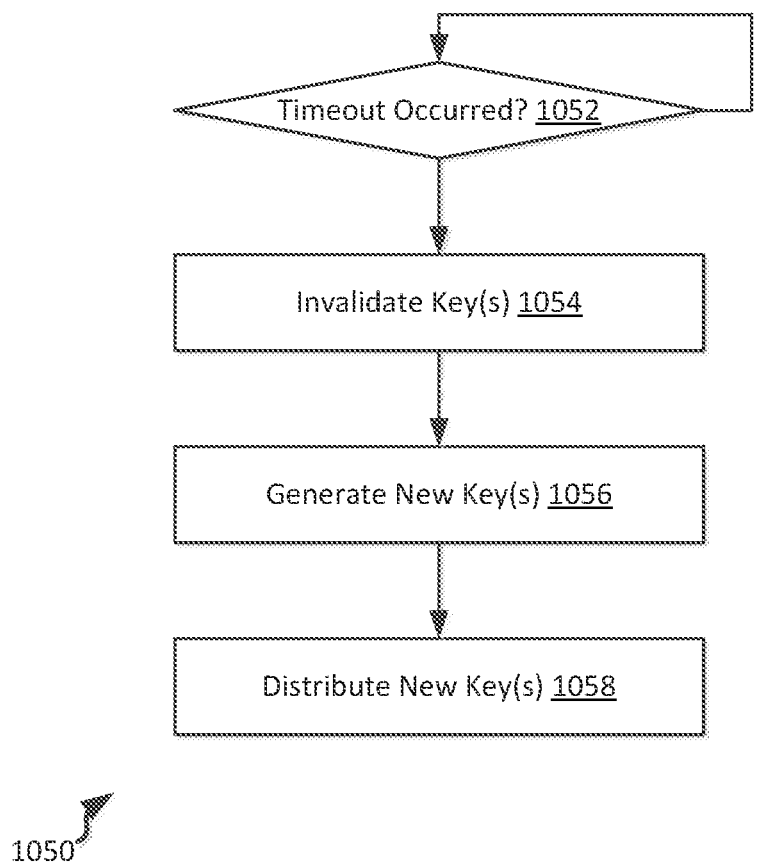
FIG. 10B illustrates a flowchart of a method of refreshing keys used to secure a zone within the non-stop computing fabric, according to an example embodiment.

FIG. 10B illustrates a method 1050 for key refresh useable in connection with the method 1000 of FIG. 10A to provide improved security within the zone of the non-stop computing fabric, according to an example embodiment. The method 1050 can be used for each zone established by an interconnect service partition to improve security of such a secure partition by periodically recycling keys, such as the zone signing key and key signing key described above in connection with FIG. 10A.

In the embodiment shown, a timeout operation 1052 determines whether a lifetime of a particular key or set of keys associated with a secure partition has elapsed. If that lifetime has not elapsed, the method involves continuing to monitor whether such a lifetime has elapsed, for example by periodically assessing a lifetime of keys associated with a particular secure partition.

If a timeout has occurred, or if it is otherwise indicated that a key has lived for more than a predetermined amount of time (e.g., as tracked using a DNS service, such as DNS service 614 of FIG. 6), a key invalidation operation 1054 can cause the keys to be invalid to access a particular secure partition or zone that includes a plurality of such partitions. A generate new keys operation 1056 can be used to associate the existing zone with a new key or keys (such as the zone signing key and key signing key described above in connection with FIG. 10A). The new keys can replace existing keys, in some embodiments, thereby performing the key invalidation operation 1054 by effecting such replacement in the DNS service. A distribution operation 1056 can distribute the keys to any secure partitions requiring those new keys, as well as to any backup DNS service instances (e.g., in other interconnect service partitions resident on other host computing systems).

It is noted that the method 1050 of FIG. 10B can be used at any preset period for any one or all of the zones managed by a DNS service. For example, keys could be changed daily, weekly, monthly, or on some other period to ensure that any keys managed by the DNS service are eventually unsuccessful in allowing access to a particular zone, even to other zones within a non-stop computing fabric. Additionally, the frequency with which keys can be required to change may differ between zones, with high-security zones requiring more frequent (e.g., daily) key changes, and lower-security zones requiring less frequent (e.g., monthly) key changes.

Figure 11:
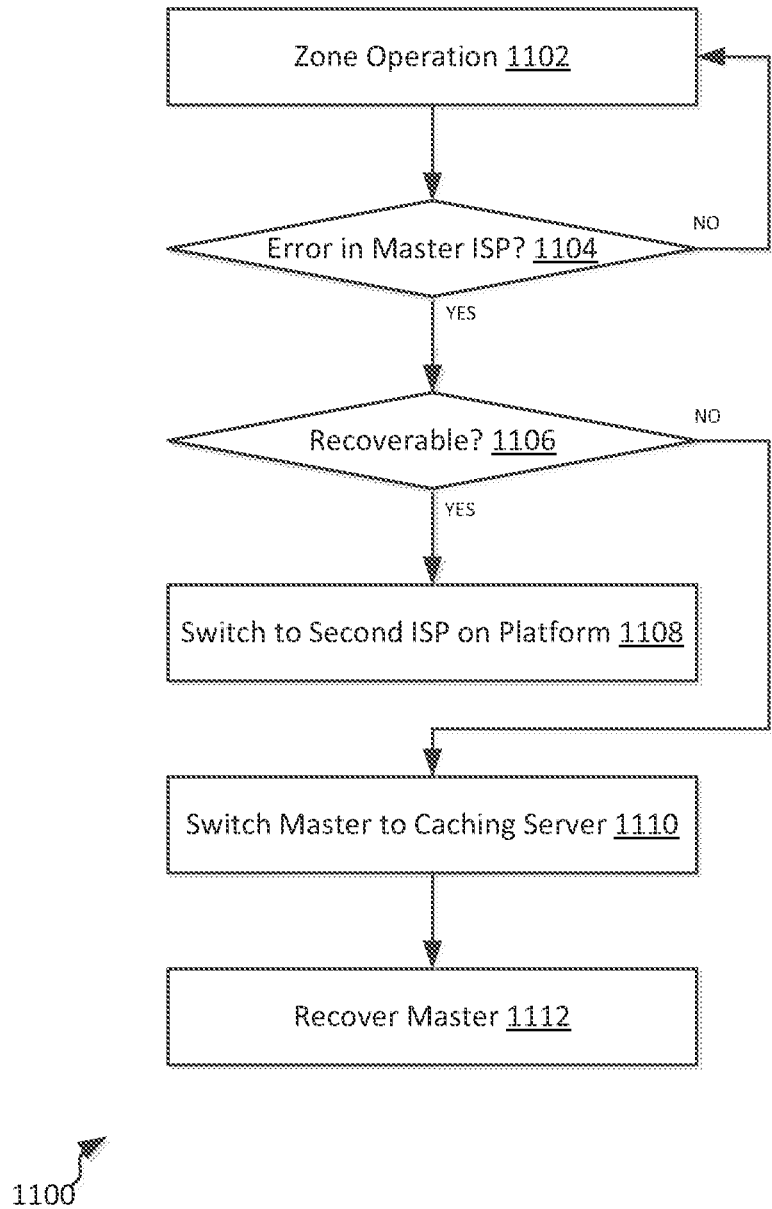
FIG. 11 illustrates a flowchart of a method of managing failover in the event of failure of a master interconnect service partition, according to an example embodiment.

FIG. 11 illustrates a flowchart of a method 1100 of managing failover in the event of failure of a master interconnect service partition, according to an example embodiment. The method 1100 can be performed, for example as illustrated in FIGS. 9A-C, to ensure continued operation of a secure fabric through failures not just of guest partitions (which can be managed through redundancy), but of interconnect services partitions, which maintain and manage definitions of communicative interconnects between partitions of the secure fabric.

In the embodiment shown, zone operation generally continues (in operation 1102) until an error is detected in a master interconnect service partition, at operation 1104. If no error is detected, normal operation continues; however, if such an error is detected, a recoverability operation 1106 determines whether the error is recoverable. For example, the recoverability operation 1106 may determine whether a particular host computing system can manage the failure itself without interrupting service. This may be, for example, based on use of redundant interconnect service partitions, where a second interconnect service partition may be used as a master partition during recovery of the failed partition. Accordingly, if the error is recoverable, a switching operation 1108 may switch a master to a backup interconnect service partition on the same platform to allow for continued operation. However, if no backup is present, or in case of a hardware failure of the host computing system (e.g., in which case switching to another partition on the failed platform may be ineffective), a platform switching operation 1110 can be used to switch a master to a caching server on a different platform. A master recovery operation 1112 can be used to attempt to recover the master, thereby allowing restoration of normal operation of secure fabrics.

Figure 12:
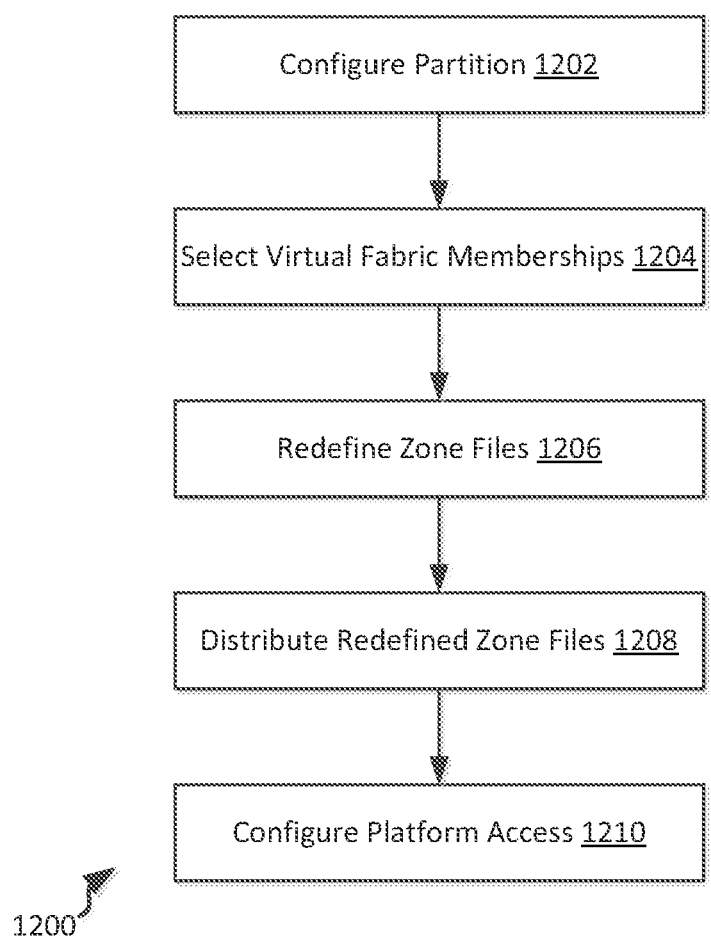
FIG. 12 illustrates a flowchart of a method of adding a partition to a zone within a non-stop computing fabric, according to an example embodiment.

FIG. 12 illustrates a flowchart of a method 1200 of adding a partition to a zone within a non-stop computing fabric, according to an example embodiment. The method 1200 can be used to configure a particular partition within a secure fabric, for example by adding that partition to a zone. In the embodiment shown, a configuration operation 1202 configures the partition, for example by loading any software workloads required, assigning the partition to a particular host computing platform, and defining resources that may be dedicated to that partition or shared by that partition with other partitions.

In the embodiment shown, a membership operation 1204 allows an administrative user to select one or more secure fabric memberships for the partition being configured. Based on that membership operation 1204, a redefinition operation 1206 redefines one or more zone files to update those files to reflect the memberships of the partition. This can include adding the partition to the zone file of the secure fabric to which it was added, as well as editing of that zone file to define updated communicative interconnections among host computing systems. The redefinition operation 1206 can also include adding the partition to a root zone, or to one or more other zone files (e.g., platform files for the platform on which the partition will reside).

Once created and/or updated, a distribution operation 1208 includes redistributing the zone files that are created across the non-stop fabric, including to the masters for the respective zones. At that time, platform access rights, such as communication port permissions, memory and/or processing permissions, redundancies, and other features are implemented at the local host computing systems are implemented.

Figure 13:
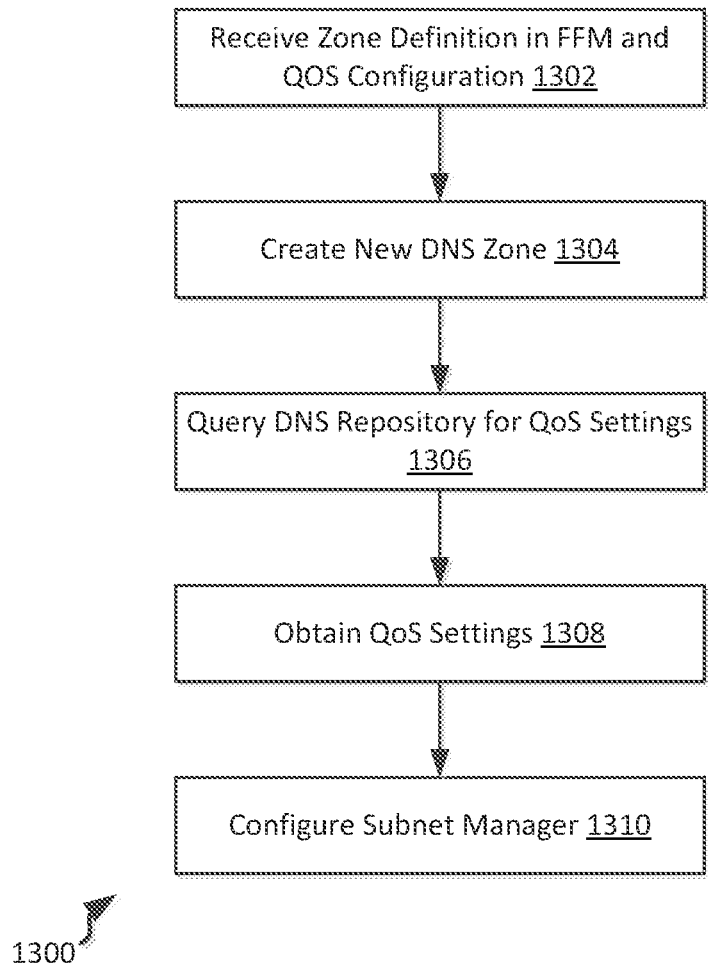
FIG. 13 illustrates a flowchart of a method of defining a zone with a predetermined quality of service within a non-stop computing fabric, according to an example embodiment.

FIG. 13 illustrates a flowchart of a method 1300 of defining a zone with a predetermined quality of service within a non-stop computing fabric, according to an example embodiment. The method 1300 generally represents a particular version of the zone definition operations described in connection with FIG. 11, but represents definition of further details regarding the quality of service to be provided to a particular partition if such QoS is specified.

In the embodiment shown, a definition operation 1302 receives a definition of a zone in a fabric manager. However, in this embodiment, the fabric manager (designated FFM in FIG. 13) also receives a quality of service (QoS) configuration, which can include minimum resource levels, definitions of uptime and/or redundancy required to meet that uptime, distributed system requirements, communications bandwidth, or any other types of performance protections as may be desired. A zone creation operation 1304 creates a new zone based on the definition received from the fabric manager, including new zone files as needed. During creation of the new zone, a query operation 1306 queries the DNS repository for quality of service settings for each of the existing partitions or zones, to determine how best to distribute the newly-defined or updated zone within the non-stop fabric. Once the QoS settings are obtained at operation 1308, a subnet manager is configured at operation 1310 to define and manage the QoS settings that may be required of the zone, and which may be used to protect execution levels for partitions within the zone, or for the zone overall.

Figure 14:
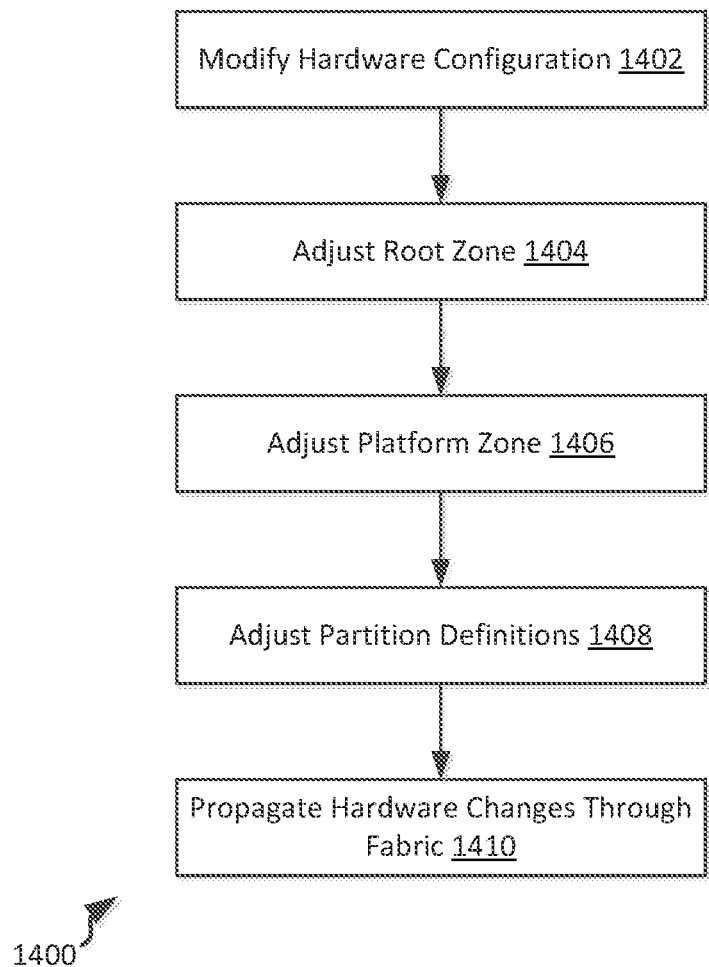
FIG. 14 illustrates a flowchart of automated adjustment of zones based on changes to hardware or partition configurations, according to an example embodiment.

As discussed above, various zones can be constructed using the non-stop computing fabric discussed herein, which allow for configurable, secure virtual networks of secure partitions across host computing systems. Referring to FIG. 14, additional details are now provided regarding changes that may be managed in the interconnect service partition, and in particular in the DNS service, based on changed configurations of the non-stop computing fabric itself.

FIG. 14 illustrates an example flowchart of a method 1400 of changing a hardware configuration within a non-stop fabric, according to an example embodiment. The changed hardware configuration, in such example embodiments, can include addition or removal of a host computing system or sponsored platform within the context of the overall non-stop fabric. In various embodiments, addition of hardware can be authorized by an administrator of the non-stop fabric, and changes to the overall non-stop fabric can be propagated automatically across the fabric via coordinated DNS services.

In the embodiment shown, an optional hardware modification operation 1402 represents a change to an underlying hardware configuration of the non-stop fabric. This can include, for example, a change to add, remove, or modify a particular piece of hardware, such as addition of a host computing system that includes para-virtualization software as described herein, or a sponsored platform as discussed above, which is hosted by a different host computing system.

A root zone modification operation 1404 represents modification of a root zone definition to include the changed hardware configuration within the zone file defining the root zone. This can be done by registering the changed configuration (e.g., registering a new host computing system) with the master DNS service associated with the root zone. Additionally, changes to a platform zone may be made by a platform zone modification operation 1406. For example, in cases where the changed hardware configuration is an added host system, a definition of a further platform zone can be created in an interconnect service partition of that host computing system, as well as registered within the master DNS service of the root zone. In embodiments where a host computing system is removed, a platform zone may be removed from the zone file defining the root zone.

In some cases, addition of hardware resources may trigger a change to a definition of a particular partition, for example by allowing creation, removal, or modification of one or more partitions, such as guest partitions. Accordingly, a partition definition adjustment operation 1408 can be performed.

In embodiments, the change to the platform zone, root zone, and/or partitions is propagated to other DNS services in a change propagation operation 1410, for example those acting as backup DNS services to the DNS service hosted by the interconnect service partition of the platform zone, or to backup DNS services for the root zone (e.g., by adding or removing that platform zone and/or partitions).

It is noted that, in the context of the present disclosure, one or more operations 1402-1410 may or may not occur, depending upon the particular change made to a non-stop fabric. For example, in some cases, a change may only take place with respect to a partition, with no underlying change to hardware. Or, in some cases, a change to hardware may occur, with no subsequent creation of partitions. Additionally, in the various embodiments discussed herein, use of an administrative tool to add hardware and/or partitions signals to relevant DNS services any changes to such hardware or partitioning configurations that allow the DNS services to register the changes to the partitions and/or hardware, thereby allowing for automated reconfiguration of the DNS zones as the underlying configuration changes.

Referring to FIGS. 1-14 overall, in accordance with the present disclosure, use of distributed partitions across distributed host computing systems, and in particular use of distributed services and master/cached computing system resources across such systems, allows for continued execution, and reliable performance of that execution, of such virtualized systems even in the event of failure of underlying services, such as service partitions utilized to provide services to the guest partitions executing workloads across host computing systems. Furthermore, use of definitions of secure fabrics in zones in a non-stop, distributed computing fabric allows for enforcement of quality of service for the partitions when implemented, thereby ensuring that no partitions are unexpectedly or gradually lag in performance due to resource over-sharing. Other advantages are apparent as well from the present disclosure, and which are reflected herein, and in particular in the claims as appended hereto.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:
1. A system comprising:
a computing fabric comprising a plurality of host platforms, the plurality of host platforms including at least a first host platform and a second host platform communicatively connected to the first host platform;
a first interconnect service partition residing on the first host platform;
a second interconnect service partition residing on the second host platform;

a plurality of guest partitions distributed across the plurality of host platforms; and a DNS server instance managed by the first interconnect service partition and defining:

a plurality of zones established via a zone file, the plurality of zones including partitions from among the plurality of guest partitions distributed across the plurality of host platforms, each zone of the plurality of zones established via the zone file defining interconnectivity among the partitions within that zone within a common virtual network, the zone file including a key useable to facilitate exclusive communication among the partitions within each zone, and a security policy for the partitions based on a zone from the plurality of zones in which each of the partitions is included, the security policy including:

permissions implemented to control intercommunication among the partitions, and rights assignable to the one or more partitions, the rights including a predefined quality of service associated with the zone;

wherein the first interconnect service partition comprises a master of at least one zone included among the plurality of zones and the second interconnect service partition comprises a caching server for the zone.

2. The system of claim 1, wherein at least one zone of the plurality of zones is associated with a predefined quality of service.

3. The system of claim 2, wherein the predefined quality of service is based at least in part on a set of defined resources included in the at least one zone.

4. The system of claim 2, wherein the predefined quality of service is based on limiting a number of zones capable of accessing at least one of the plurality of host platforms.

5. The system of claim 1, wherein the DNS server instance is managed by the first interconnect service partition of the first host platform and the first host platform has a platform zone, and wherein the DNS server instance is a master DNS server for the platform zone of the first host platform.

6. The system of claim 5, further comprising a second DNS server instance is managed by the second interconnect service partition of the second host platform and the second host platform has a platform zone, and wherein the second DNS server instance is a master DNS server for the platform zone of the second host platform concurrently with being a caching server for the zone.

7. The system of claim 6, wherein the second DNS server instance is a caching DNS server for the platform zone of the first host platform.

8. The system of claim 1, wherein the DNS server instance on the first host platform comprises a master DNS server for a root zone incorporating each of a plurality of interconnect service partitions residing on one or more of the plurality of host platforms and the plurality of guest partitions distributed across the plurality of host platforms.

9. The system of claim 1, further comprising a computing system communicatively connected to the first host platform and the second host platform, the computing system being a sponsored member of a zone within the plurality of zones.

10. The system of claim 1, wherein receiving the definition of the zone occurs at a fabric manager tool of the computing fabric.

11. A method of managing partitions in a computing fabric, the method comprising:

receiving a definition of a plurality of zones within the computing fabric, the computing fabric including a first host computing system and a second host computing system;

establishing the plurality of zones within the computing fabric via a zone file managed by a DNS service of a first interconnect service partition of the first host computing system, the plurality of zones including a zone having a plurality of guest partitions across the first host computing system and the second host computing system, each zone of the plurality of zones established via the zone file defining interconnectivity among the partitions within that zone within a common virtual network, the zone file including a key useable to facilitate exclusive communication among the partitions within each zone; and implementing a security policy for the plurality of guest partitions based on the zone, the security policy defined by the DNS service of the first interconnect service partition of the first host computing system and including:

permissions implemented to control intercommunication among the plurality of guest partitions, and rights assignable to the plurality of guest partitions, the rights including a predefined quality of service associated with the zone;

wherein the second host computing system includes a second interconnect service partition;

wherein the first interconnect service partition of the first host computing system comprises a master of the zone and the second interconnect service partition comprises a caching server for the zone.

12. The method of claim 11, further comprising routing the definition of the zone to the first host computing system.

13. The method of claim 11, further comprising generating a zone signing key and a key signing key at the first host computing system.

14. The method of claim 11, further comprising generating the zone file in a control partition of the first host computing system.

15. The method of claim 14, further comprising forwarding the zone file to the first interconnect service partition of the first computing system.

16. The method of claim 11, further comprising, upon occurrence of an error in the first interconnect service partition of the first host computing system, assigning the second interconnect service partition of the second host computing system as the master of the zone.

17. The method of claim 11, further comprising recovering the first interconnect service partition of the first computing system.

18. A method of managing partitions in a computing fabric, the method comprising:

receiving a definition of a plurality of zones within the computing fabric, the computing fabric including a first host computing system and a second host computing system;

establishing the plurality of zones within the computing fabric via a zone file managed by a DNS service of a first interconnect service partition of the first host computing system, the plurality of zones including a zone having a plurality of guest partitions across the first host computing system and the second host computing system; and implementing a security policy for the plurality of guest partitions based on the zone, the security policy defined by the DNS service of the first interconnect service partition of the first host computing system and including:
- permissions implemented to control intercommunication among the plurality of guest partitions, the permissions limiting connection to the first host computing system to host computing systems including partitions included in any zone also including a partition hosted by the first host computing system, each zone of the plurality of zones established via the zone file defining interconnectivity among the partitions within that zone within a common virtual network, the zone file including a key useable to facilitate exclusive communication among the partitions within each zone, and
- rights assignable to the plurality of guest partitions, the rights including a predefined quality of service associated with the zone;

establishing a second interconnect service partition on the second host computing;

wherein the first interconnect service partition of the first host computing system comprises a master of the zone and the second interconnect service partition comprises a caching server for the zone.

19. The system of claim 1, wherein the zone file further includes an error policy;
wherein the error policy defines the second interconnect service partition of the second host system as a master of the zone in an event that an error occurs in the first interconnect service partition of the first host computing system.

20. The system of claim 1, wherein the zone file further includes a recovery policy; and
wherein the recovery policy defines a recovery process that is performed in response to an error in the first interconnect service partition.

* * * * *